United States Patent
Schildkraut et al.

(10) Patent No.: US 6,252,976 B1
(45) Date of Patent: Jun. 26, 2001

(54) COMPUTER PROGRAM PRODUCT FOR REDEYE DETECTION

(75) Inventors: Jay S. Schildkraut; Robert T. Gray, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/084,774

(22) Filed: May 26, 1998

Related U.S. Application Data

(63) Continuation-in-part of application No. 08/919,560, filed on Aug. 29, 1997.

(51) Int. Cl.[7] .................................................. G06K 9/00
(52) U.S. Cl. .................... 382/117; 382/118; 382/167; 382/199; 382/209
(58) Field of Search .................................... 382/117, 164, 382/209, 199, 167, 118

(56) References Cited

U.S. PATENT DOCUMENTS

| | | | | |
|---|---|---|---|---|
| 4,689,666 | * | 8/1987 | Hatanaka | 348/624 |
| 5,008,946 | * | 4/1991 | Ando | 382/1 |
| 5,128,711 | * | 7/1992 | Terashita et al. | 355/41 |
| 5,130,935 | * | 7/1992 | Takiguchi | 364/526 |
| 5,355,163 | * | 10/1994 | Tomitaka | 348/234 |
| 5,430,809 | * | 7/1995 | Tomitaka | 382/173 |
| 5,432,863 | * | 7/1995 | Benati et al. | 382/167 |
| 5,572,596 | * | 11/1996 | Wildes et al. | 382/190 |
| 5,719,951 | * | 2/1998 | Shackliton et al. | 382/118 |
| 5,859,921 | * | 1/1999 | Suzuki | 382/171 |
| 5,878,156 | * | 3/1999 | Okumura | 382/118 |
| 5,990,973 | * | 11/1999 | Sakamoto | 348/576 |
| 5,991,549 | * | 11/1999 | Tsuchida | 396/158 |

FOREIGN PATENT DOCUMENTS

| 101998-233929 | 9/1998 | (JP) | H02N/1/60 |
|---|---|---|---|

OTHER PUBLICATIONS

Jie Yang et al., "A real–time face tracker", IEEE (pp. 142–147), May 1996.*

* cited by examiner

Primary Examiner—Matthew C. Bella
Assistant Examiner—Sheela Chawan
(74) Attorney, Agent, or Firm—William F. Noval

(57) ABSTRACT

A computer program product for detecting eye color defects of a subject in an image due to flash illumination comprises: a computer readable storage medium having a computer program stored thereon for performing the steps of detecting skin colored regions in a digital image; searching the skin colored regions for groups of pixels with color characteristic of redeye defect; and correcting color of the pixels based on a location of redeye defect found in step (b).

13 Claims, 20 Drawing Sheets

COMPUTER PROGRAM PRODUCT FOR REDEYE DETECTION

CROSS REFERENCE TO RELATED APPLICATIONS

This is a Continuation-in-part of application Ser. No. 08/919,560, filed Aug. 29, 1997, entitled "A Computer Program Product For Redeye Detection" by Jay Schildkraut, et al.

FIELD OF THE INVENTION

The invention relates generally to the field of digital image processing and, more particular to a method for detecting redeye in digital images.

BACKGROUND OF THE INVENTION

When flash illumination is used for the capture of an image sometimes the pupils of people in the image appear red. This is caused by light from the flash unit entering the pupil, multiply reflecting off the retina, and finally exiting back through the pupil. Because light is partially absorbed by capillaries in the retina the pupil appears red in the image. This phenomena is referred to as "redeye." The probability of redeye being observed increases the closer the flash unit is to the optical axis of the lens. Therefore, redeye is commonly observed in images captured by a small camera with an integral flash unit.

Commonly assigned U.S. Pat. No. 5,432,863 describes a user-interactive method for the detection of objects in an image that have the color characteristic of redeye. This method automatically detects candidate redeye pixels based on shape coloration and brightness.

Although the presently known method of detecting redeye is satisfactory, it is not without drawbacks. The method of U.S. Pat. No. 5,432,863 does not determine whether the candidate pixels are located in a face or are part of a human eye.

Consequently, a need exists for detecting redeye that overcomes the above-described drawbacks.

SUMMARY OF THE INVENTION

The present invention is directed to overcoming one or more of the problems set forth above. Briefly summarized, according to one aspect of the present invention, the invention resides in a computer program product for detecting eye color defects of a subject in an image due to flash illumination, comprising : a computer readable storage medium having a computer program stored thereon for performing the steps of: (a) detecting skin colored regions in a digital image; (b) searching the skin colored regions for groups of pixels with color characteristic of redeye defect; and (c) correcting color of the pixels based on a location of redeye defect found in step (b).

It is an object of the present invention to provide a method for automatically detecting redeye defects.

It is an object of the present invention to provide a method for determining whether candidate redeye defects are part of the human face.

It is also an object of the present invention to provide a method for determining whether candidate redeye defects are part of the human eye.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
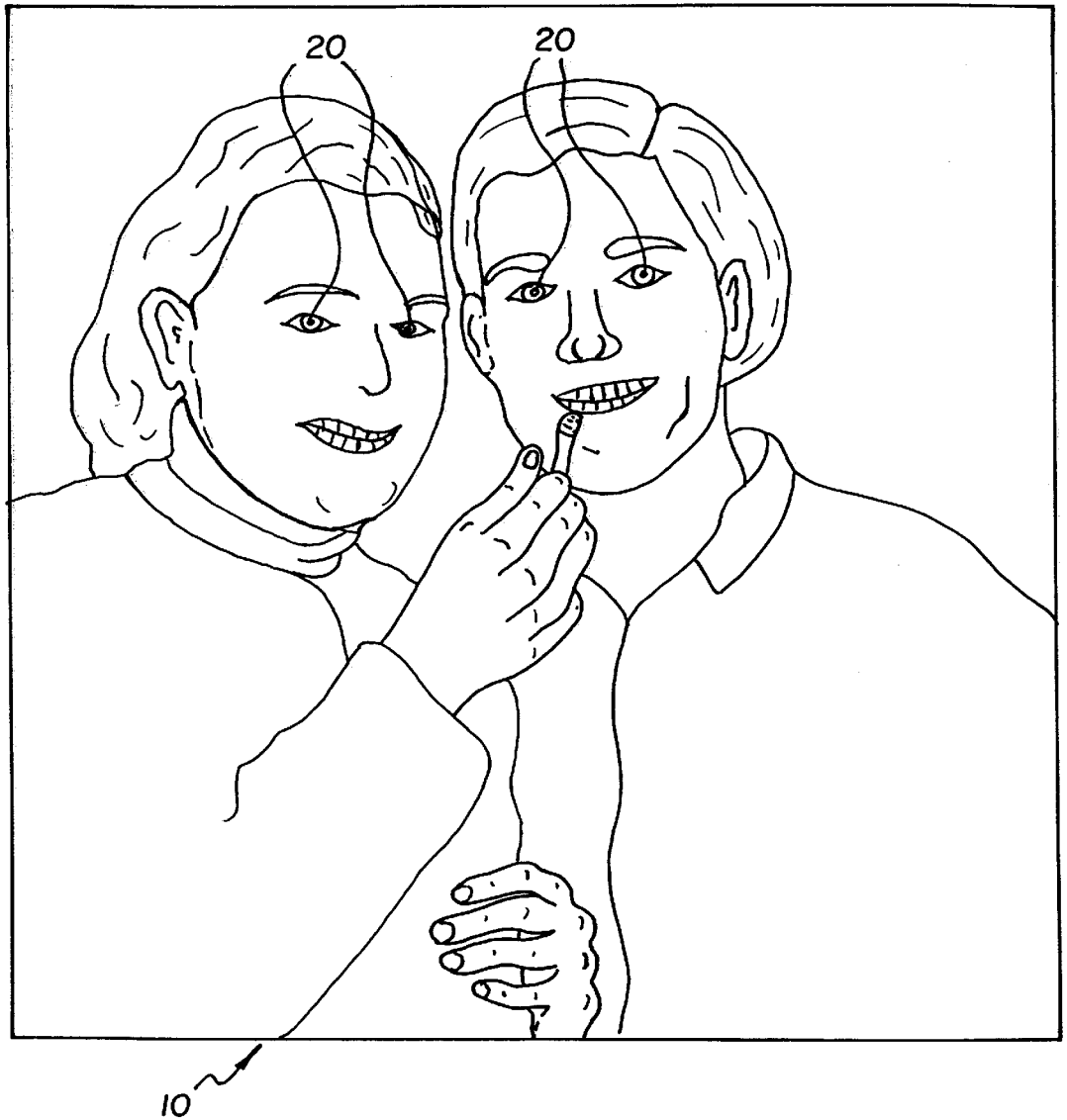
FIG. 1 is a diagram illustrating redeye.

FIG. 1 is a grayscale image 10 of a color image illustrating two pairs of redeyes 20.

Figure 2:
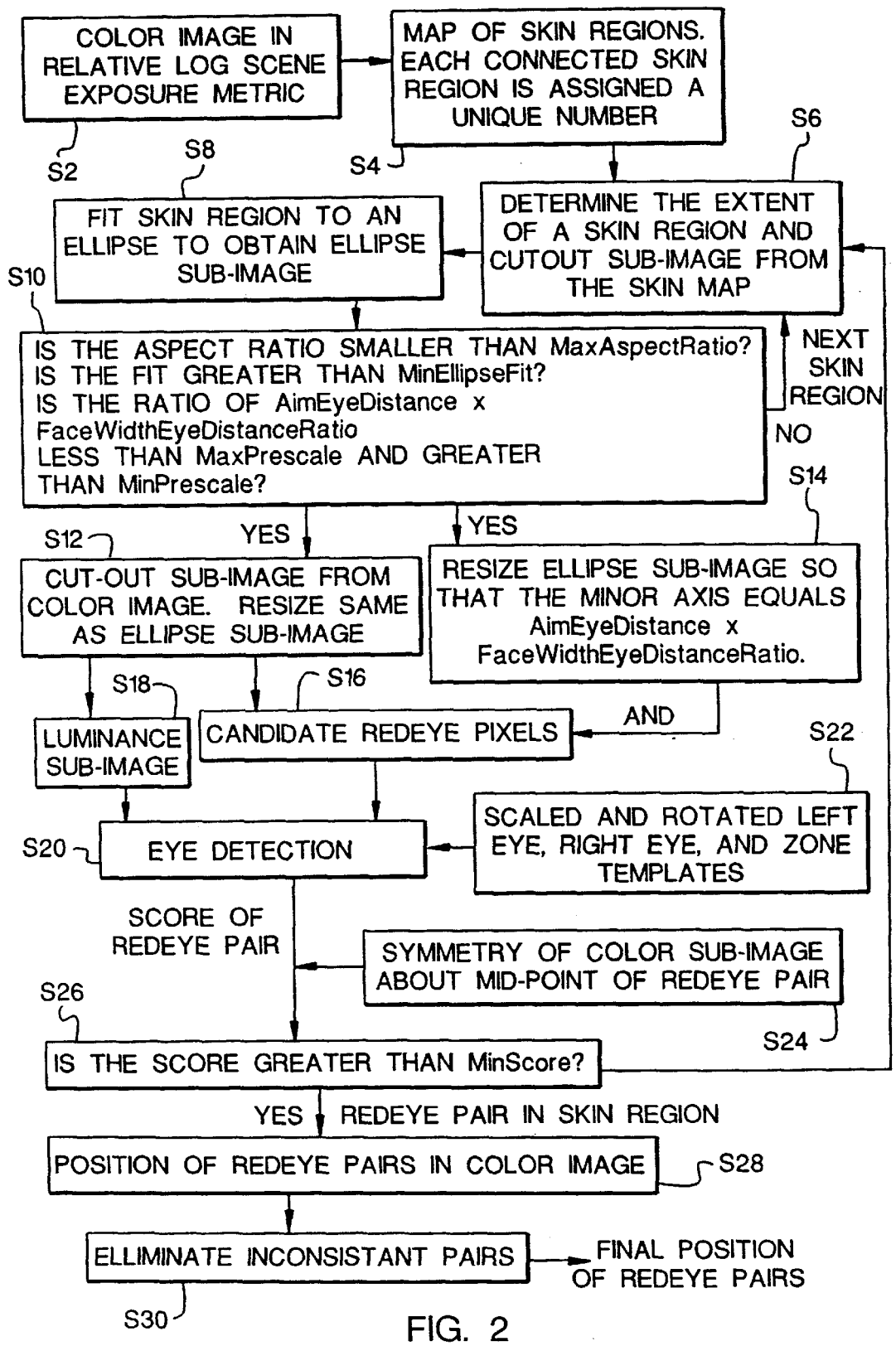
FIG. 2 is an overview flowchart of the software program of the present invention.

Referring to FIG. 2, there is illustrated an overview flowchart of the present invention. A color digital image is input to the software program residing on a computer system, such computer systems being well known in the art. The code values of the digital image are preferably proportional to the log of the amount of exposure of the film used to capture the image by the original scene S2. The program begins by identifying all separate continuous skin colored regions in the image S4.

Figure 3:
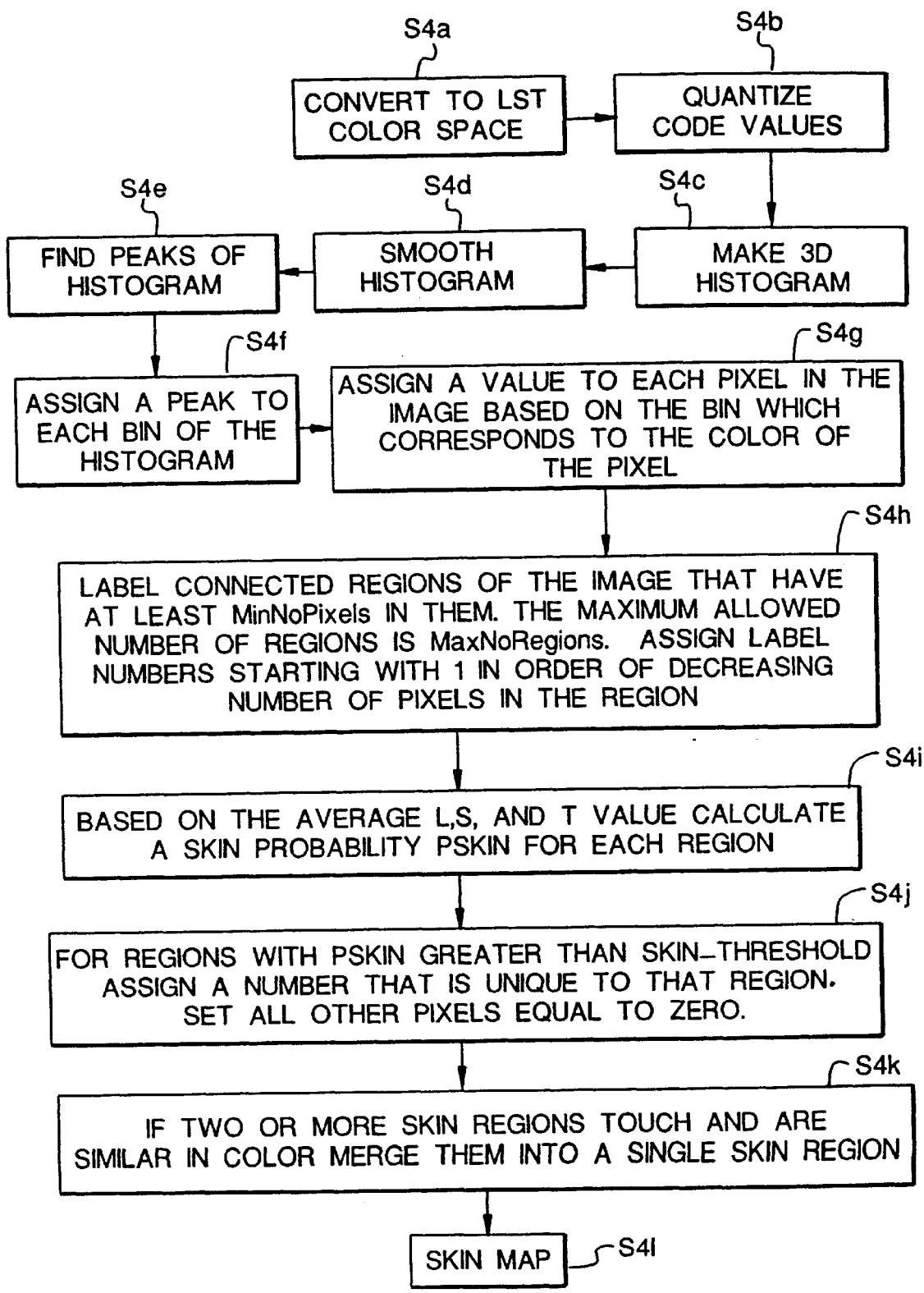
FIG. 3 is a detailed flowchart of the continuous skin colored region determination portion of FIG. 2.

Referring to FIG. 3, there is illustrated a detail flowchart of step S4 in FIG. 2. First, the red, green, and blue values of the color image are converted into LST color space S4a using the relations:

$$L = \frac{1}{\sqrt{3}}(R+G+B)$$

$$S = \frac{1}{\sqrt{2}}(R - B)$$

$$T = \frac{1}{\sqrt{6}}(R + B - 2G)$$

where R, G, and B, are the red, green, and blue code value of a pixel in the color image, respectively.

The next step is to build a three-dimensional histogram. In order to reduce the size of the histogram, first, the L, S, and T code values are quantized by dividing them by 8.0×sqrt(3), 2.0, and 2.0, respectively S4b. These quantized code values are referred to as L', S', and T'. Each combination of L', S', and T' values is referred to as a "bin" of the histogram. The value of the histogram H(L', S', T') S4c is equal to the number of pixels in the image that have quantized code values of L', S', and T'. An alternative way of stating this is that the histogram tell us the number of pixels in the image that fall into each bin. This number is referred to as the value of the bin.

The histogram is smoothed S4d by replacing the value of each bin by a weighted average of the value of that bin and the values of immediate neighboring bins. Next, the peak values in the histogram are found S4e and each bin in the histogram is assigned S4f the peak value that is located closest to it. Finally, since each pixel in the color image has been assigned to a bin of the histogram and each bin has been assigned to a peak, a peak is assigned to each pixel in the color image S4g. The single band image in which a pixel's code value is equal to the number of the peak that it was assigned to is referred to as the segmented image.

Continuous regions in the segmented image that have the same code value are likely to correspond to an object or part of an object in the color image. A unique number (label) is assigned to all such regions in the segmented image S4h. The numbers are sequentially assigned starting with 1 for the region with the greatest number of pixels. The single band image in which code values correspond to the label of the region that the pixel belongs to is called the labeled image.

The program then decides which of the continuous regions in the segmented image corresponds to a region in the color image that has a color that is typical of human skin. The average L, S, and T code values of each region is calculated and, based on this, each region is assigned a score $P_{skin}$ S4i. A high value of $P_{skin}$ indicates that the region is of a color that is typical of human skin. Alternatively, a low number indicates that the color of the region is atypical of skin. Regions for which $P_{skin}$ exceeds a threshold $T_{skin}$ of 0.10 are referred to as skin-colored regions S4j.

One final step is necessary to associate each face in the color image with a single skin colored region. The process described above will often result in a single face being associated with more that one skin colored region because due to complexion, shadows, and etc., the color of the face is not uniform. Two skin colored regions are merged into a single skin colored region if two conditions are satisfied S4k. The first condition requires that the two regions be interconnected. A pixel in region i has a connection to region j if a pixel belonging to region j is one of the eight nearest neighbor pixels. A function Q(i, j) is calculated which is proportional to the number of connections between pixels of region i and j. The function is normalized so that Q(i, i) is equal to 1.0. If Q(i, j) exceeds the threshold MinMergerFraction regions i and will be merged into a single region if the second condition is also satisfied, for example a thresh old of 0.005 may be used. The second condition is that the distance between the colors of the regions i and j given by $$D_{color} = ((L_i - L_j)^2 + (S_i - S_j)^2 + (T_i - T_j)^2)^{\frac{1}{2}}$$

must be less than MaxMergeColorDistance which is set equal to 40.0.

The process of merging skin colored regions begins with the smallest region which, if the two conditions are satisfied, is merged with a larger region. If region i is merged with larger region j it may then happen that region j gets merged with an even larger region k. When this occurs regions i,j, and k are merged into a single region. Note that regions i and k may be merged together even though the above two conditions are not satisfied for these two regions. They are merged because of their mutual connection to region j.

Figure 4:
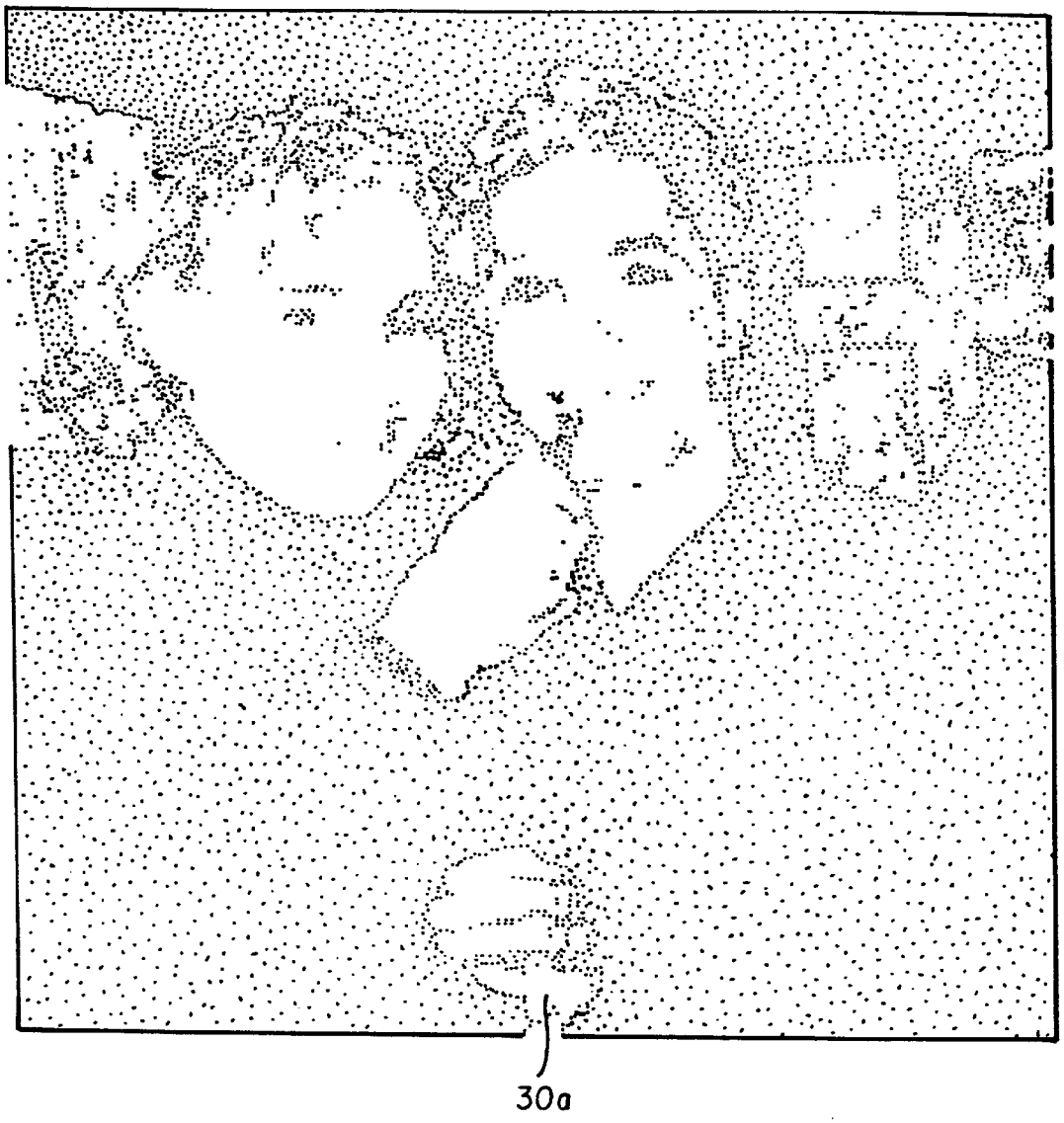
FIG. 4 is a binary representation of FIG. 1 illustrating skin-colored regions.

The result of skin color detection is a map of the skin colored regions in the color image S4l. Areas that are not skin colored are given a code value of zero. The separate continuous skin colored regions are numbered consecutively in order of decreasing region size beginning with the number 1. FIG. 4 shows a map of the skin colored regions in FIG. 1.

Figure 5:
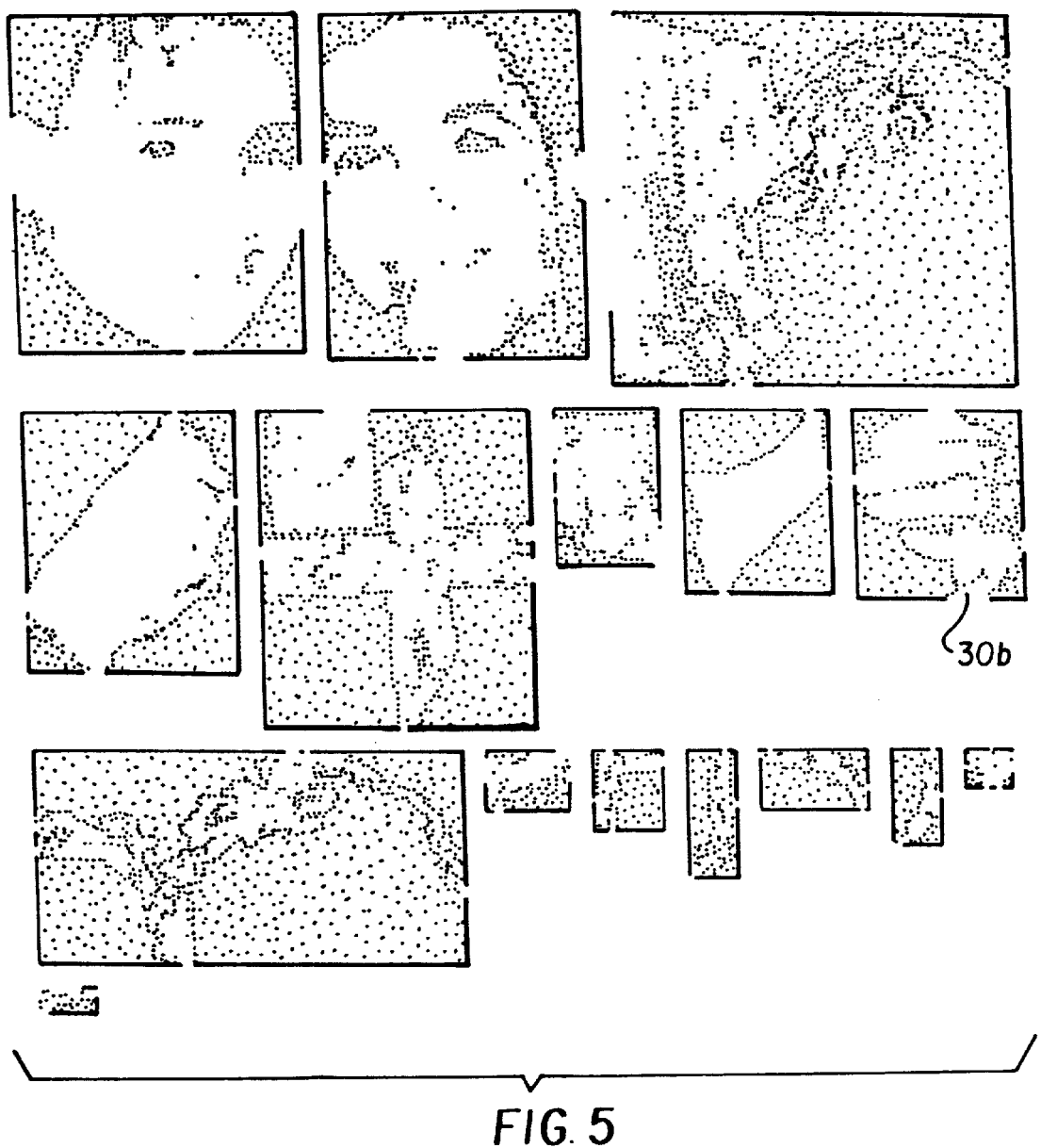
FIG. 5 is a detailed viewed of the individual continuos colored regions of FIG. 4.

Referring to FIG. 2, and as illustrated in FIG. 5, a sub-map of each skin colored region is formed by cutting out from the skin map (FIG. 4) the smallest rectangular section that contains all of that skin region S6. For example, skin region 30b in FIG. 5 corresponds to skin region 30a in FIG. 4. FIG. 5 shows the map of each separate continuous skin colored regions as an individual sub-map. The column and row of the skin map that correspond to the top left corner of the sub-map are referred to as $Col_{cutout}$ and $Row_{cutout}$, respectively. In the sub-map code values of 255 (white) indicates that the pixel is located at a position at which skin color is present. A code value of 0 (black) indicates the absence of skin color.

Figure 6:
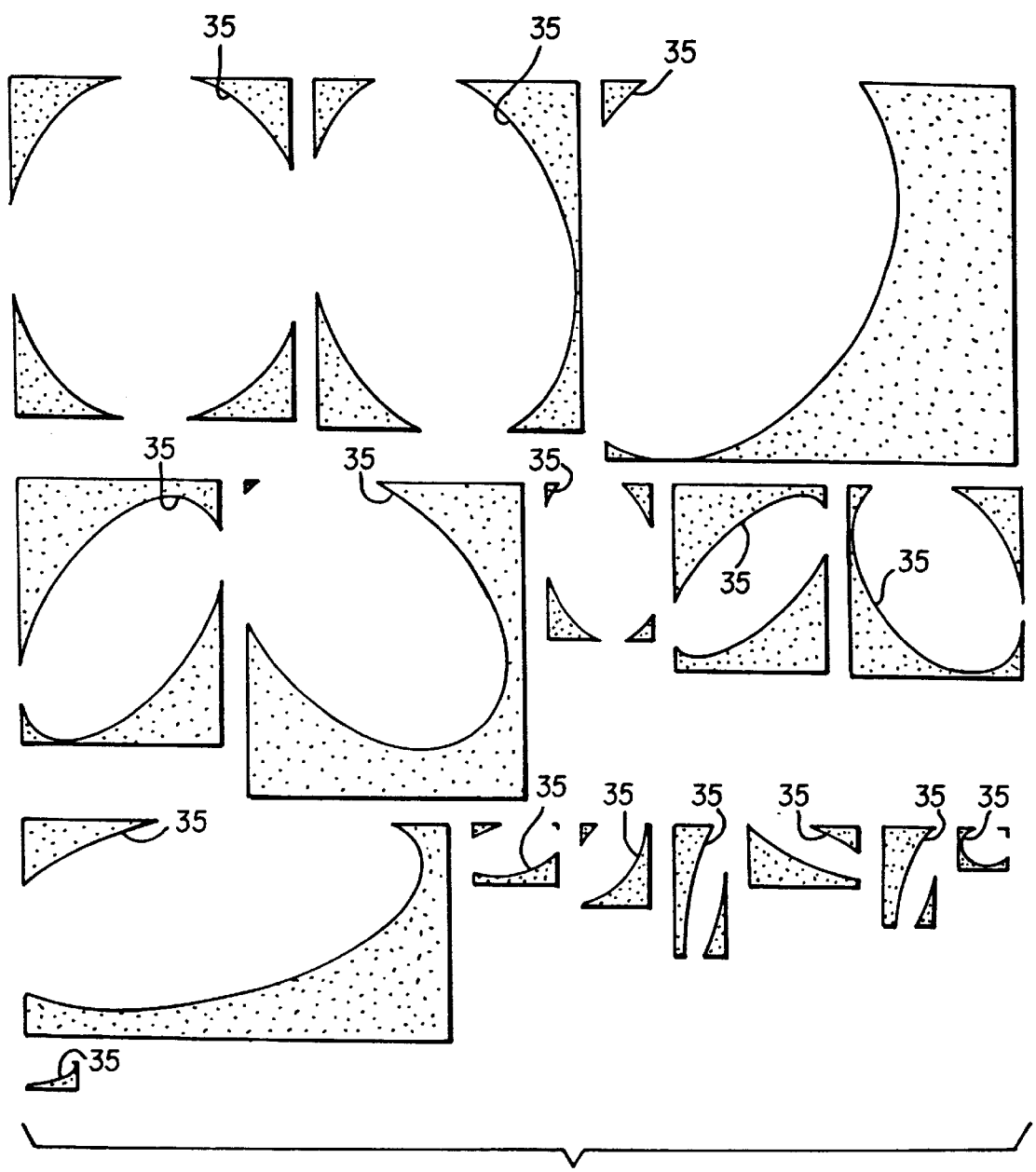
FIG. 6 is a diagram of ellipses fitted to the views of FIG. 5.

Referring to FIG. 2, and as illustrated in FIG. 6, in the next step an ellipse 35 is fitted S8 to the individual skin color sub-maps found in step S6 (FIG. 5). A method of fitting an ellipse to a binary image is described in *Computer and Robot Vision, Volume I*, by Robert M. Haralick and Linda G. Shapiro, Addison-Wesley (1992), pp. 639–658. A human face is approximately elliptical. Therefore, if the skin color sub-map is of a human face, then the ellipse should fit the skin color map well and the minor axis of the ellipse should approximately equal the width of the face. A measure of the fit of an ellipse to the skin color sub-map is given by $$\text{Fit} = \frac{1}{2}\left(2 - \frac{N_{out}}{N} - \frac{A - N_{in}}{A}\right)$$

where N is the number of skin colored pixels (code value 225) in the map, $N_{out}$ is the number of skin colored pixels that fall outside the ellipse, $N_{in}$ is the number of skin colored pixels that are inside the ellipse, and A is the number of pixels in the ellipse. A is also referred to as the area of the ellipse. If all of the skin colored pixels are in the ellipse and the number of skin colored pixels equals the area of the ellipse then Fit is equal to one and the fit is perfect. When skin colored pixels fall outside of the ellipse or the area of the ellipse is greater than the number of skin colored pixels inside it then the value of Fit is diminished. If the value of Fit is less than a predetermined value MinEllipseFit which is set equal to 0.70 then we conclude that the skin colored region is not a face and we do not process it further S10.

Another indication of whether the skin color sub-map is of a face is the aspect ratio of the ellipse AspectRatio which is given by $$AspectRatio = \frac{D_{major}}{D_{minor}}$$

where $D_{major}$ is the major axis of the ellipse and $D_{minor}$ is the minor axis in pixels. If AspectRatio is greater than MaxAspectRatio which is set equal to 3.0 the skin colored region corresponds to an object in the image that is too long and thin to be a face. The program determines that the skin colored region is not a face and does not process it further S10.

Figure 7:
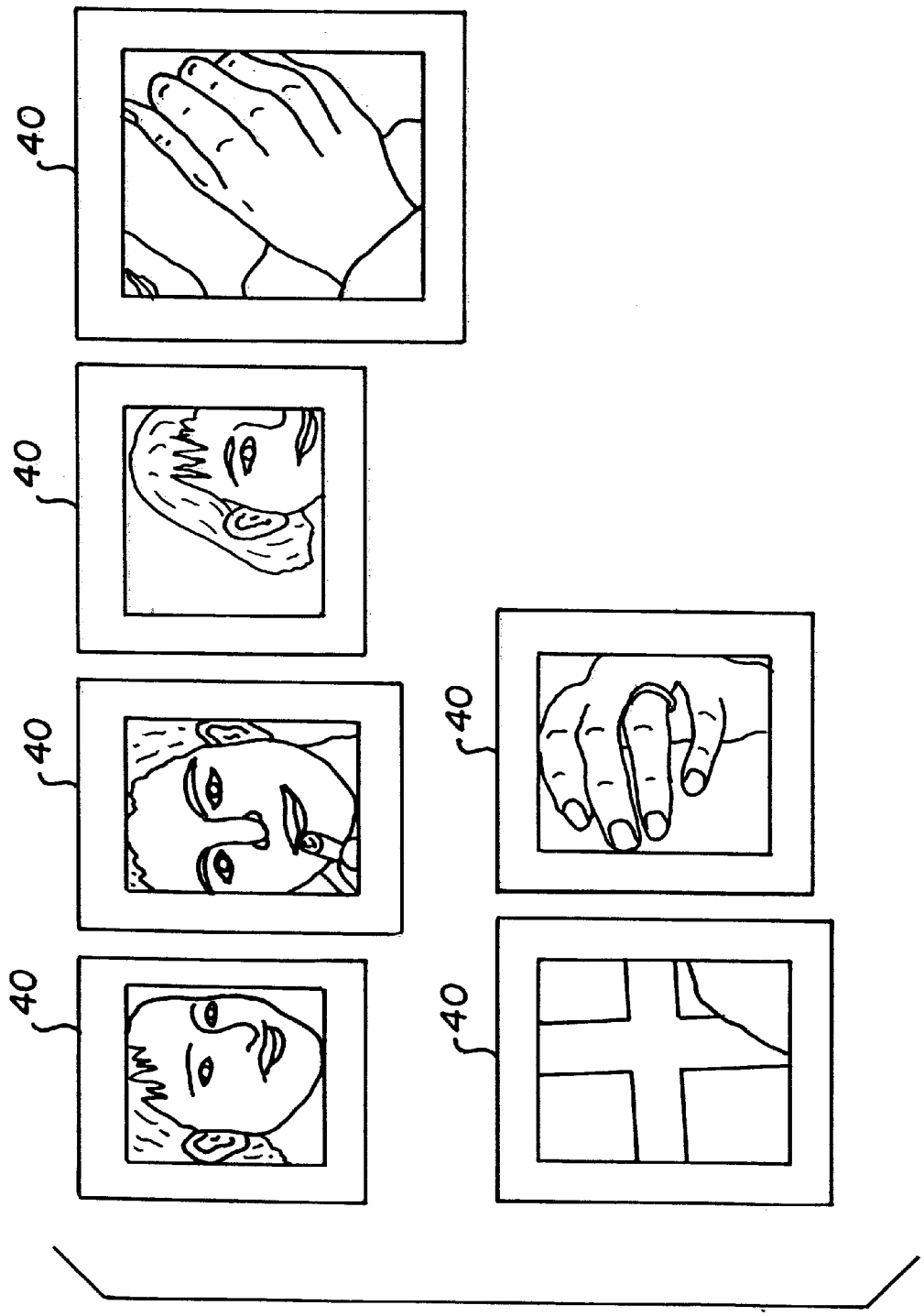
FIG. 7 illustrates resized candidate face regions.
Figure 8:
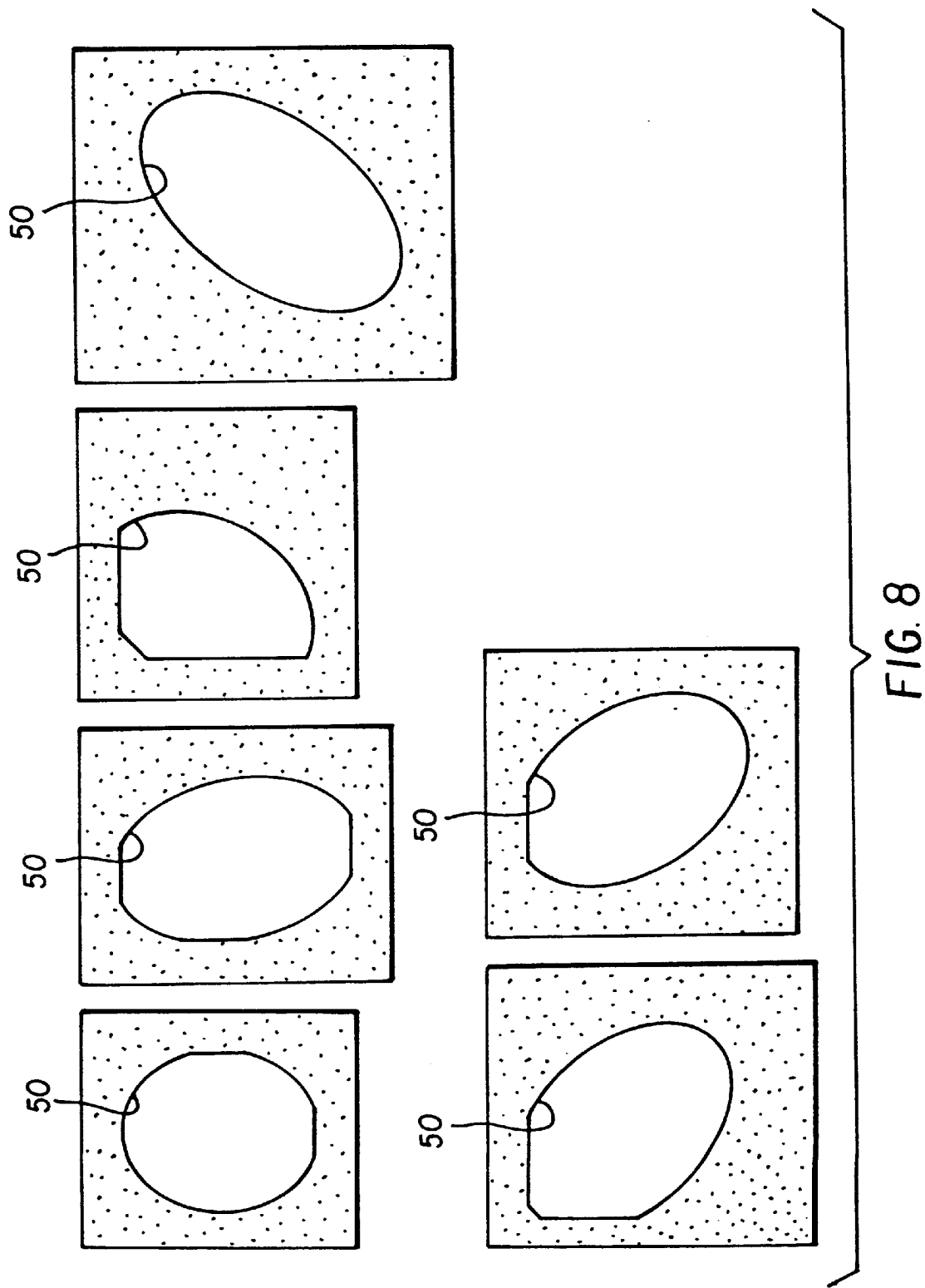
FIG. 8 is a diagram of resized ellipses corresponding to the candidate face regions fitted to FIG. 7.

If the skin sub-map has an acceptable degree of fit to an ellipse and the ellipse has an acceptable aspect ratio, the map potentially indicates the position of a face. Next, we calculate a resize factor $S_{prescale}$ which is given by the following equation $$S_{prescale} = \frac{AimEyeDistance \times FaceWidthEyeDistanceRatio}{D_{minor}}$$

where AimEyeDistance which is set equal to 75 pixels is the desired distance between eyes, and Face WidthEyeDistanceRatio which is set equal to 2.0 is the ratio between the width and eye distance for a typical face. If $S_{prescale}$ is less than MinPrescale 0.10 or greater than MaxPrescale 1.50 the skin colored region is not processed further S10. The next step is to cut-out from the color image a sub-color-image that corresponds exactly to the location of the sub-map S12. If the minor axis of the ellipse is approximately equal to the width of the face then the distance between the eyes in the face should be close to AimEyeDistance. FIG. 7 shows the sub-color-images 40 after they have been resized in this manner. It is instructive to note that FIG. 7 is illustrated as a gray scale drawing, although the actual image is a color image. FIG. 8 shows the ellipses 50 that correspond to each of these sub-color-images that have also been resized S14. In practice, it is desirable to add extra rows and columns to the edges of the resized sub-color-images images and sub-maps so that when these images are processed further an out-of-bounds pixel is not addressed. The top and bottom of the images are padded with Pad rows and the left and right side with Pad columns.

Figure 9:
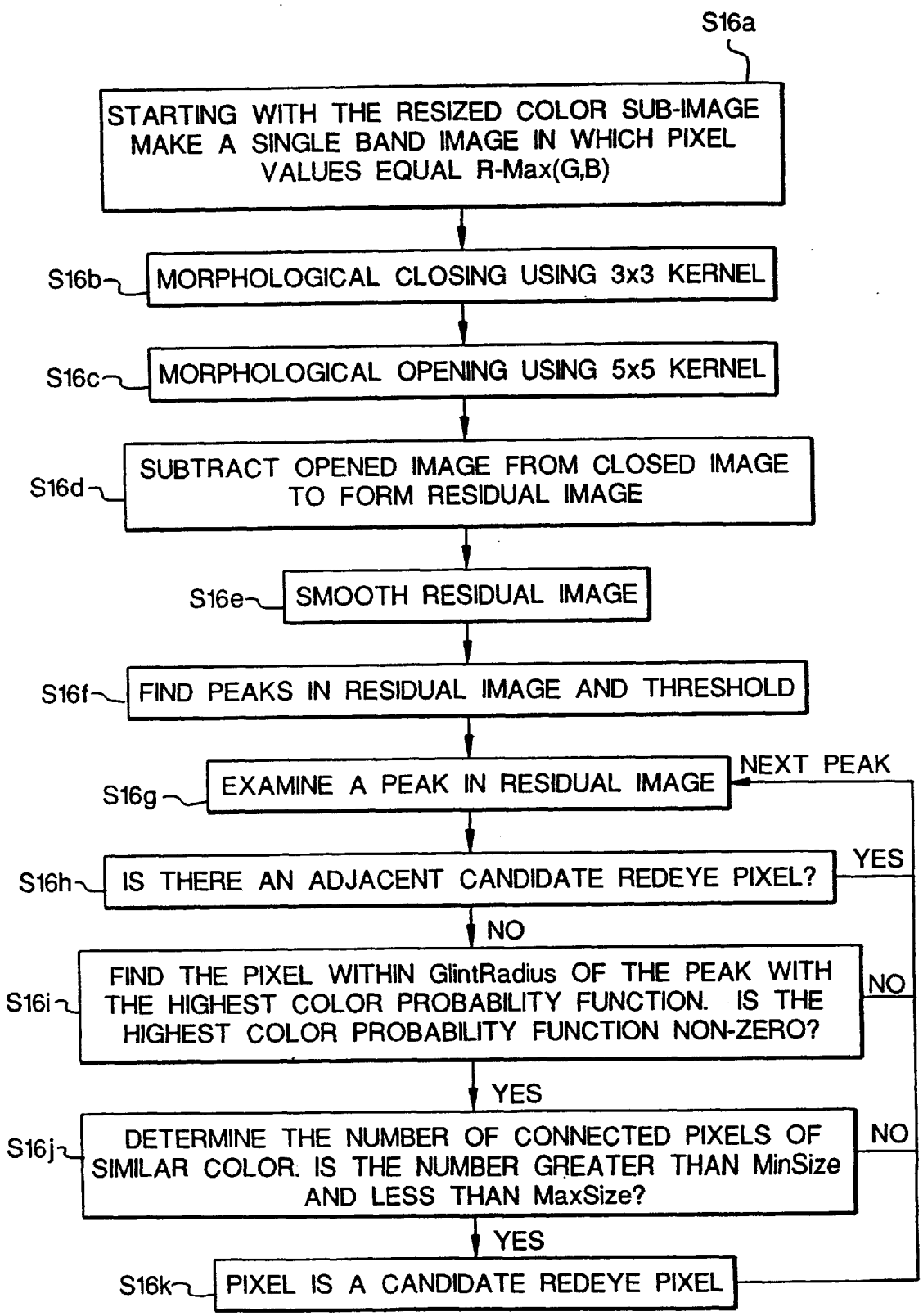
FIG. 9 is a detailed flowchart of the candidate redeye determination portion of FIG. 2.

Now that skin colored regions that have the shape of a face have been identified, the location of candidate redeyes need to be identified S16, which is illustrated in detail in FIG. 9. Now referring to FIG. 9, the sub-color-images 40 are processed so as to identify small red features. The program begins by defining a new single band image S16a with pixel values X given by $$X = R - Max(G, B)$$

where R, G, and B, are the red, green, and blue code value of the sub-color-image, respectively.

Redeyes in the new image will appear as small elliptical areas of high code value possibly with a small low code value region in the middle that is due to glint in the pupil. The affect of glint is removed by performing a gray scale morphological closing S16b using a W_close ×W_close kernel, for example a 3×3 kernal although other sizes may also be used. Gray scale morphological operations are disclosed in *Image Analysis and Mathematical Morphology Volume* 1, by Jean Serra, Academic Press (1982), pp. 424–478. Next, the small regions of high code value are removed by a gray scale morphological opening operation using a W_open ×W_open kernel, for example a 5×5 kernal although other sizes may also be used S16c. The opened image is then subtracted from the closed image in order to form a residual image S16d. This image shows what was in the opened image, but not in the closed image. Namely, small regions of high code value which correspond to small red features in the sub-color-image. Next, the residual image is smoothed S16e with a linear filter having the kernel shown below.

1 2 1

2 4 2

1 2 1

Figure 10:
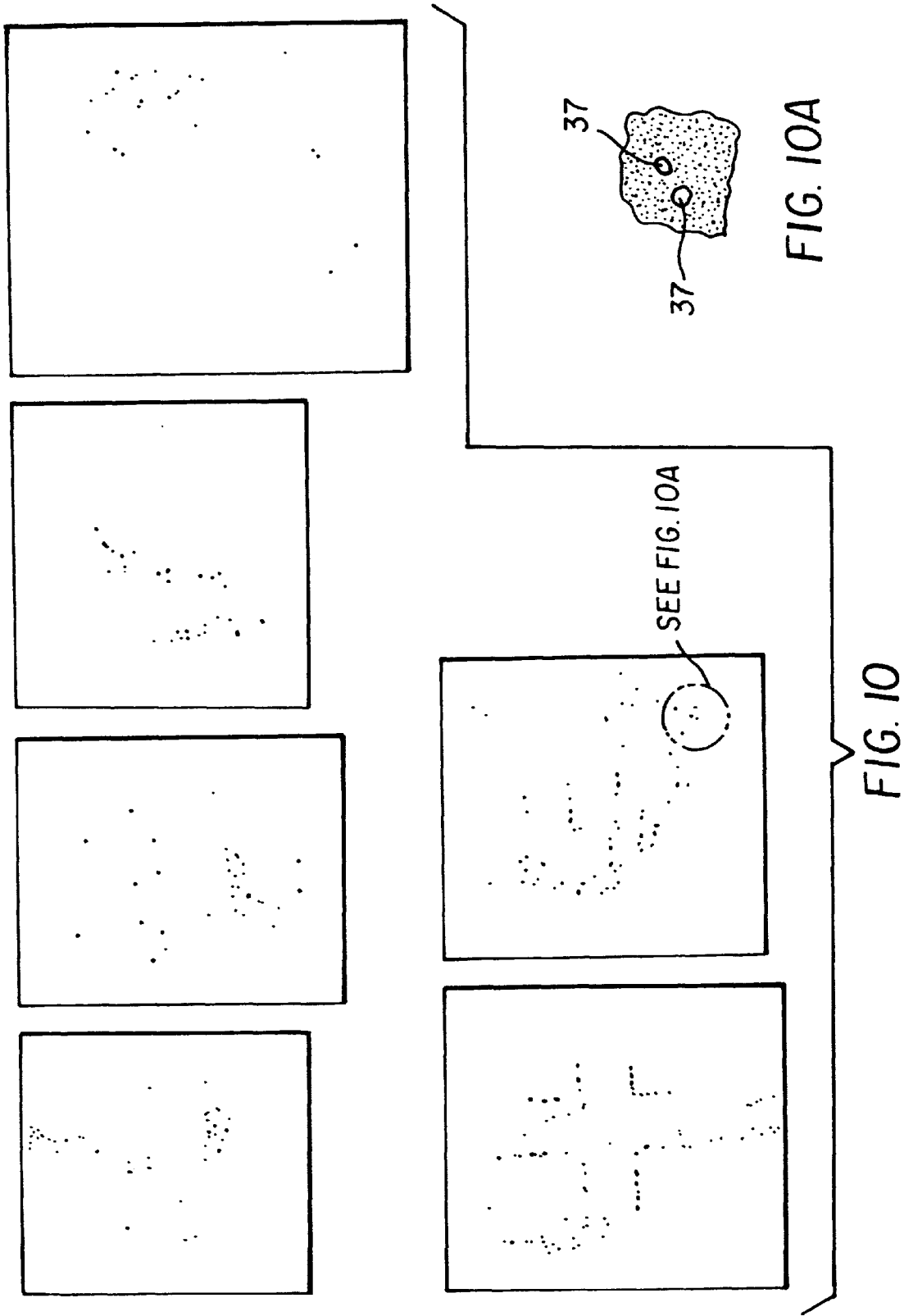
FIG. 10 illustrates the candidate redeye defects of FIG. 7.

For each pixel in the smoothed residual image, a 7×7 window centered at that pixel is examined. If the code value of that pixel exceeds the threshold Tpeak which is set equal to 5 and is greater than or equal to the code value of all the other pixels in the window, that pixel is classified as a peak S16f. FIG. 10 shows the peaks 37 for all of the sub-color-images in FIG. 7. After all the peaks in the smoothed residual image have been found the individual peaks are examined S16g. First, if a pixel has been classified as a peak and a neighboring pixel that is west, north-west, north, or north-east of this pixel has also been classified as a peak, the peak is eliminated S16h.

A pixel that has been classified as a peak is a candidate redeye pixel. It is possible however that the location of the peak coincides with glint in the pupil and not the red defect. For this reason, pixels within a distance GlintRadius equal to 2 from the peak are examined S16i. The candidate redeye pixel is moved to the nearby pixel with the highest color score $P_{color}$ which will be defined below.

Next, the candidate redeye pixel is used as a seed to grow a continuous region of pixels of similar color. If the number of pixels in the region is less than MinSize or greater than MaxSize the region is not of a size that is characteristic of a redeye defect and the candidate redeye pixel is eliminated S16j.

The result of the above processing is a map of candidate redeye pixels for each sub-color-image S16k. The ellipses in FIG. 8 are approximate maps of the region in the corresponding sub-color-images in FIG. 7 that have been identified as potentially being a face. Therefore, only the candidate redeye pixels that fall inside of the ellipse are considered in the next phase eye detection which is outlined in FIG. 11.

Referring back to FIG. 2, the purpose of eye detection is to determine whether the candidate redeye pixels are indeed part of an eye. The eye detection procedure requires a monotone version of the color image S18. The green band of the color image is used after the contrast is increased by transforming the green pixel code values using the equation $$G = 255\left(\frac{G}{255}\right)^{\gamma}$$

where G is the code value of the green band and γ is a parameter which is set equal to 2.0. This monocolor version of the color image will be referred to as the luminance image.

Figure 12:
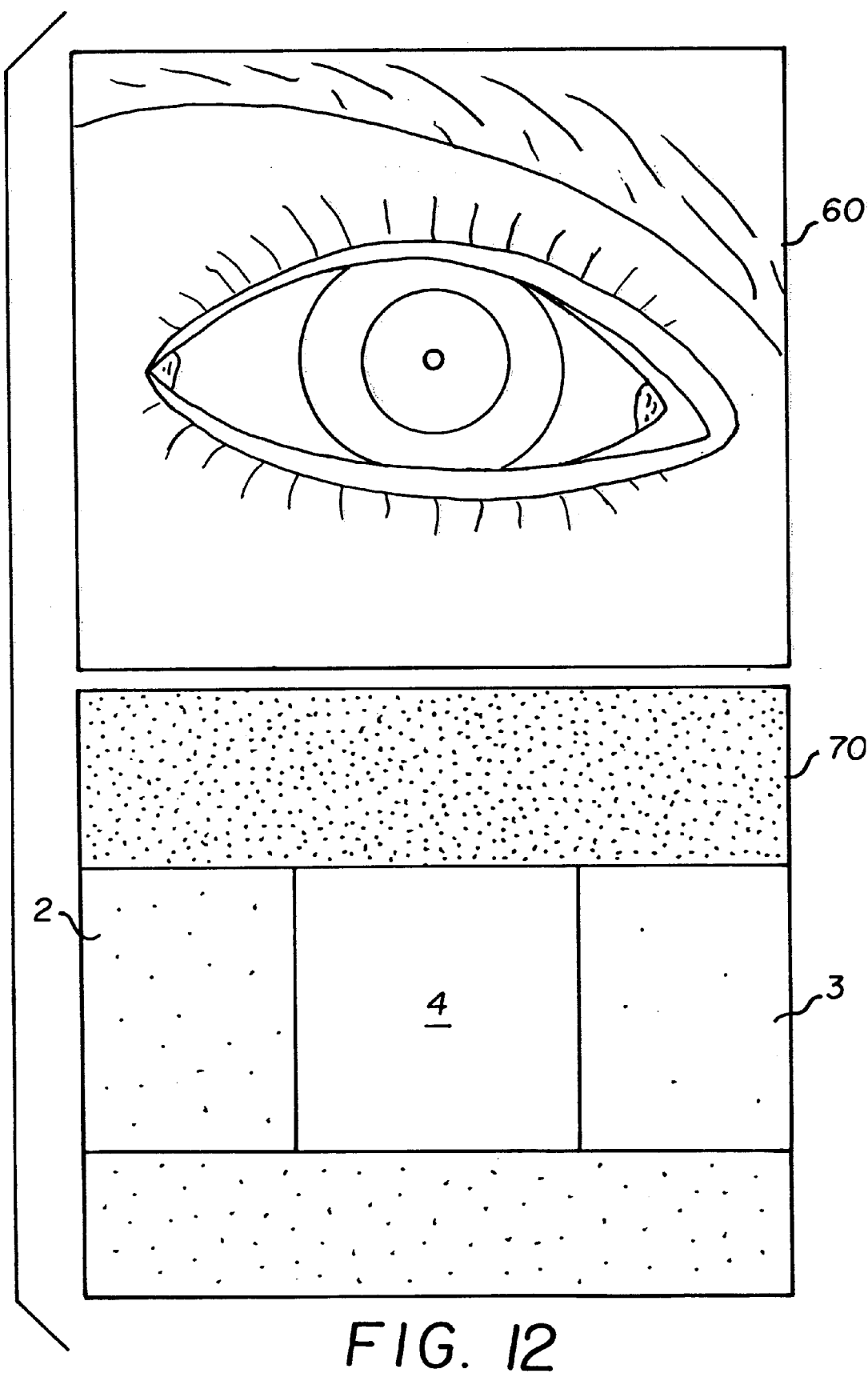
FIG. 12 illustrates an eye template, and zone map.

The eye detection procedure S20 in FIG. 2 is based on the process of template matching. It facilitates understanding to note that any image of an eye can be used a the template. The top image 60 in FIG. 12 shows a left-eye template. The bottom image 70 shows a division of the template into zones. Zone 1 is the eyebrow region. Zones 2 and 3 are the left and right sides of the eye, respectively. Zone 4 includes the pupil and iris. Zone 0 is not used. The eye template was taken from an image in which the distance between the eyes is TemplateEyeDistance equal to 306 pixels and the tilt of the two eyes is close to zero. As discussed above, a pair of redeyes in the resized color sub-images should be approximately a distance AimEyeDistance (75 pixels) apart. Therefore, in order for the template to be of the proper size to match an eye is must be resized by a factor of $$S_0 = \frac{AimEyeDistance}{TemplateEyeDistance}$$

In practice, the estimation of the face width from the minor axis of the ellipse will not always be accurate. Also, the eyes may be tilted. For this reason starting with the original left-eye template and the zone map, a collection of left-eye, right-eye (mirror image of left-eye), and zone maps are generated that span a range of sizes and orientations S22. The original eye template and zone map are resized from a factor of $S_0 \times$Narrow to $S_0 \times$Wide in increments of SStep. Preferred values of Narrow, Wide, and Sstep are 1.5, 0.50, and 0.05, respectively. In order to accommodate tilt for each resize factor, a series of tilted templates and zone maps are generated that range from –MaxTilt degrees (clock-wise tilt) to MaxTilt degrees in increments of TStep degrees S22. The preferred value of MaxTilt is 30 degrees and of TStep is 2.0 degrees.

Figure 11:
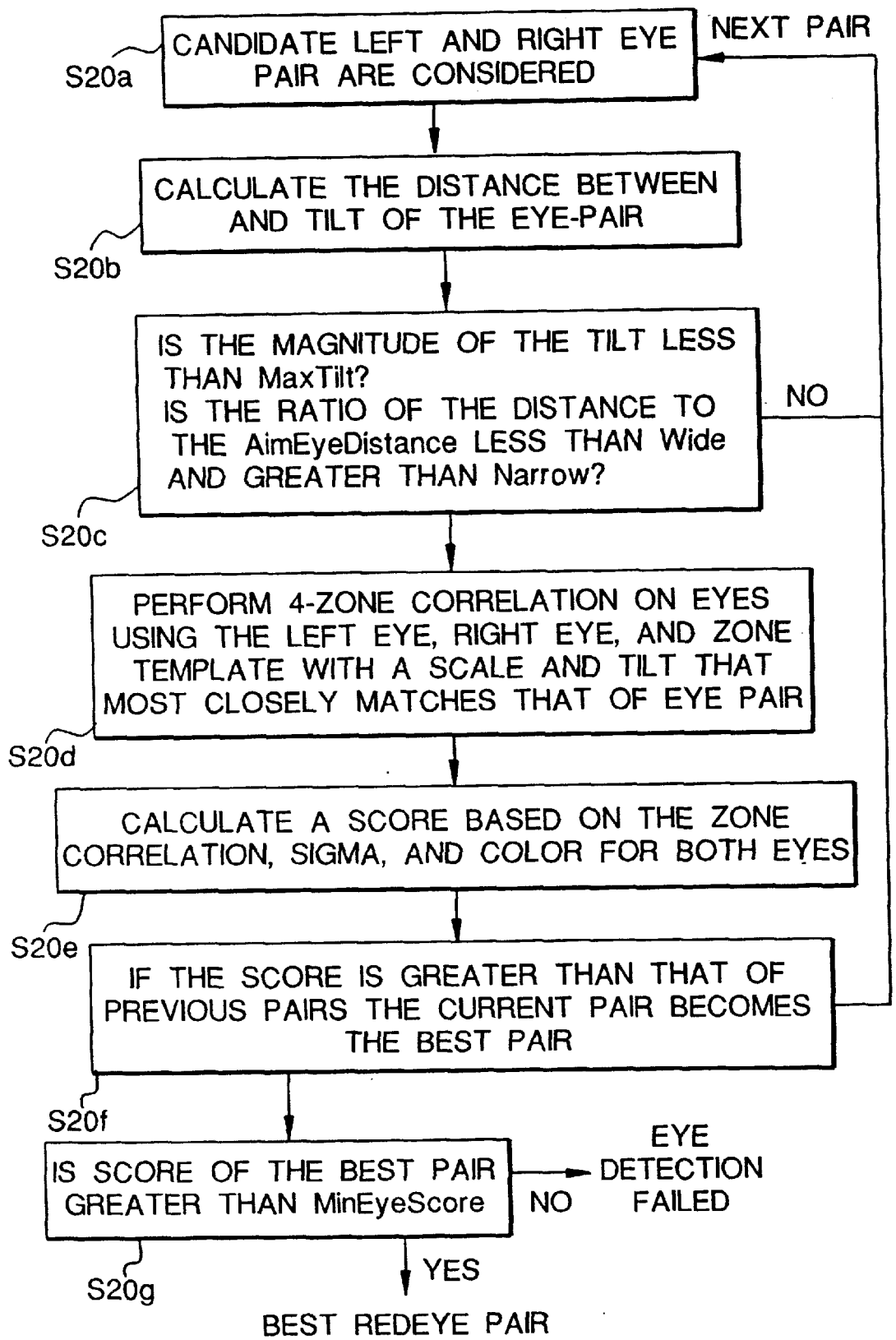
FIG. 11 is a detailed flowchart of the eye detection portion of FIG. 2.

Referring to FIG. 11, a detailed flowchart of step S20 of FIG. 2 is shown. A pair of candidate redeye pixels are considered that hypothetically belong to a left and right redeye pair S20a. The scale of the eye relative to the original eye template is related to the distance S20b between the candidate redeye pixal pair by the equation $$S_{pair} = \frac{((L_p - R_p)^2 + (L_l - R_l)^2)^{1/2}}{TemplateEyeDistance}$$

where $L_p$ ($R_p$) is the column of the left (right) candidate redeye pixel, $L_l$ ($R_l$) is the row of the left (right) candidate redeye pixel. (The column numbers begin with 1 and increase from left to right. The row numbers begin with 1 and increase from top to bottom.) The tilt S20b between the candidate redeye pixels is given by $$Tilt = \tan^{-1}\left(\frac{L_l - R_l}{R_p - L_p}\right)$$

As discussed above, an ensemble of eye templates and zone map templates were made that span a range of resize factors from $S_0 \times$Narrow to $S_0 \times$Wide with resolution SStep and with a tilt from –MaxTilt degrees to MaxTilt degrees with a resolution TStep. The left-eye template, right-eye template, and zone map that most closely match the value of $S_{pair}$ and Tilt for the pair of candidate redeye pixels is used in the correlation step that follows. If $S_{pair}$ or Tilt are outside of this range, this pair is not processed further S20c.

After an eye template has been selected the next step is to determine if the region around the redeye pixel matches an eye. This is done by performing a correlation of the left-eye template with a region around the left candidate redeye pixel and the right-eye template with a region around the right candidate redeye pixel of the luminance image S20d. One step of the correlation process is to match up pixels of the template and luminance image and calculate the product of their code values. The center of the template images corresponds to the center of the eye. Since the candidate redeye pixels are close, but not necessarily at the center of an eye, we perform the correlation several times with the center of the template matched to all of the pixels within a square that extends a distance LookAround equal to 3 about the candidate redeye pixel. The correlation is performed separately for zones 1 through 4 of the template (see FIG. 12). These correlations are referred to as Cz1, Cz2, Cz3, and Cz4. In addition, an overall correlation is calculated for a region that consists of the sum of zones 1 through 4. This overall correlation is referred to as C. The pixel in the square around the candidate redeye pixel with the highest value of the overall correlation C is the best guess of the center of an eye which contains the candidate redeye pixel. This pixel is referred to as the eye-center pixel. Both the left and right candidate redeye pixels have an associated eye-center pixel.

The correlation process is now explained in detail. The template image is denoted by the function $\Phi(p,l)$ where p is the column number and l is the row number. The number of columns and rows in the template is w and h, respectively. The center of the eye template is approximately the location of the center of the eye. A zone of the template is correlated with the luminance image which we denote by $\Gamma(p,l)$ at column $p_o$ and row $l_o$ by calculating the product $\Pi$ given by $$\Pi = \frac{1}{N_z} \sum_{p \in z} \sum_{l \in z} \Gamma(p + p_o - w/2 - 1, l + l_o - h/2 - 1) \Phi(p, l)$$

where p∈Z means that column p is in zone Z, l∈Z means that row l is in zone Z, and $N_z$ is the number of pixels in the zone. The mean code value of the template in zone Z given by $$M_\Phi = \frac{1}{N_z} \sum_{p \in z} \sum_{l \in z} \Phi(p, l)$$

is also calculated. In addition, the standard deviation of the template in zone Z is calculated according to the equation.

$$\sigma_\Phi = \left(\frac{1}{N_z} \sum_{p \in z} \sum_{l \in z} (\Phi(p, l) - M_\Phi)^2\right)^{1/2}$$

Similarly, we calculate the mean code value of the luminance image in zone Z using the equation $$M_\Gamma = \frac{1}{N_z} \sum_{p \in z} \sum_{l \in z} \Gamma(p + p_o - w/2 - 1, l + l_o - h/2 - 1)$$

and the standard deviation using the following equation $$\sigma_\Gamma = \left(\frac{1}{N_z} \sum_{p \in z} \sum_{l \in z} (\Gamma(p + p_o - w/2 - 1, l + l_o - h/2 - 1) - M_\Gamma)^2\right)^{1/2}$$

Using the quantities defined above the correlation of the luminance image with the template in zone Z is given by the relation $$C_z = \frac{\Pi - M_\Phi M_\Gamma}{\sigma_\Phi \sigma_\Gamma}$$

If the code values of the image and the template are exactly the same in zone Z then $C_z$ is equal to 1.0. If the image and the template are completely uncorrelated then $C_z$ will be equal to zero.

Figure 13:
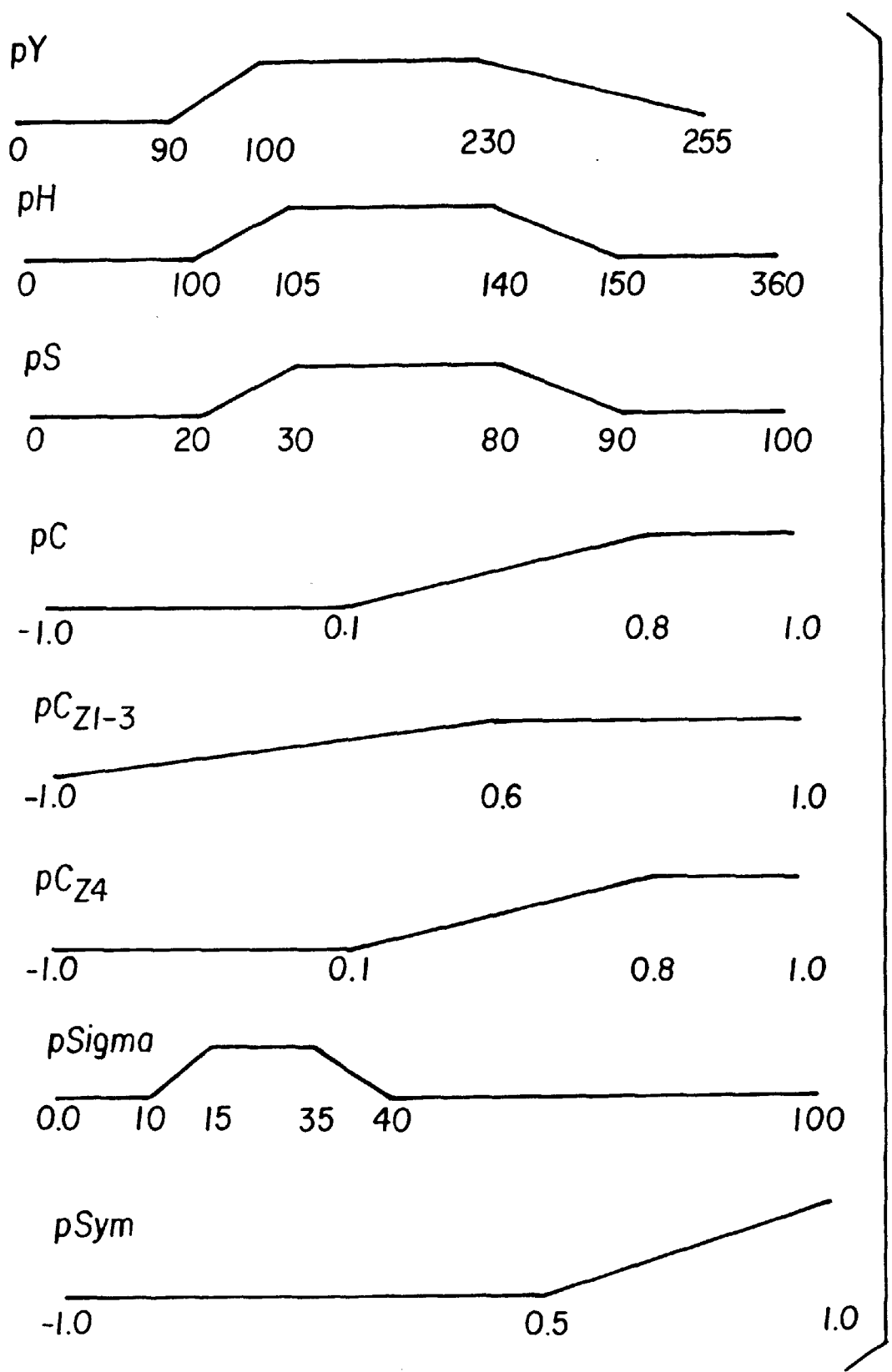
FIG. 13 illustrates scoring functions of the present invention.

The values of C, $C_{z1}$, $C_{z2}$, $C_{z3}$, and $C_{z4}$ for the eye-center pixels are used in the calculation of a score that is a measure of the likelihood that the pair of candidate redeye pixels are part of a redeye defect in the sub-color-image S20e. Each of the correlations are used as a variable in an associated scoring function that ranges from 0.0 to 1.0. For example, the scoring function associated with the overall correlation C which we refer to as pC(C) is 0.0 if the value of C for an eye-center pixel indicates that it is very unlikely that the pixel actually is located at the center of an eye. On the other hand, if the value of C is in a range that is typical of the correlation of the template with an eye then pC(C) is 1.0. Otherwise pC(C) takes on an intermediate value. The scoring function pC(C) and other scoring functions described below are shown in FIG. 13.

Scores are defined based on these scoring functions which will be combined later into an overall score for a candidate redeye pair. The following equation defines a score $P_{corr}$ related to the overall correlation C as simply $$P_{corr} = pC(C)$$

The score $P_{zone}$ associated with the zone correlations is a weighted average of the zone correlation scoring functions. It has been found that the correlation in zone 4 (the pupil) is a much more reliable indicator of the presence of an eye than the other zones. For this reason it is given more weight than other zones. Typical we set the weight W equal to 6.0. $P_{zone}$ is given by $$P_{zone} = \frac{pC_{z1}(C_{Z1}) + pC_{z2}(C_{z2}) + pC_{z3}(C_{z3}) + WpC_{z4}(C_{z4})}{W + 3}$$

It has been found that the standard deviation of the luminance image $\sigma_\Gamma$ that was calculated in the process of calculating the overall correlation C is a good indicator if the feature in the luminance image centered at the eye-center pixel is actually an eye. For instance, if $\sigma_\Gamma$ is very low than the feature is of too low contrast to be an eye. With this in mind we define a score associated with $\sigma_\Gamma$ by $$P_{sigma} = p\text{Sigma}(\sigma_\Gamma)$$

Finally, the color of the candidate redeye pixel must be indicative of a real redeye defect. For this calculation the red, green, and blue, code values of the candidate redeye pixel is convert into luminance (Lum), hue (Hue), and saturation (Sat) values. Luminance is calculated as follows $$Lum = \frac{\text{Max}(R, G, B) + \text{Min}(R, G, B)}{2}$$

The value of Lum for a pixel ranges from zero to the highest possible code value. The saturation given by $$Sat = 100 \frac{\text{Max}(R, G, B) - \text{Min}(R, G, B)}{\text{Max}(R, G, B)}$$

is a value ranging from 0 to 100. The hue is defined as in *Computer Graphics Principles and Practice 2nd ed.,* Addison-Wesley Publishing Company, page 592, except the color red is shifted to a hue angle of 120 degrees. The value of Hue may range from 0 to 360 degrees. The score that is related to the color of the candidate redeye pixel is defined by $$P_{color} = pL(\text{Lum})pH(\text{Hue})pS(\text{Sat})$$

The result is a score $P_{eye}$ which indicates the likelihood that a candidate redeye pixel is actually part of a redeye defect in the image. This score is defined by $$P_{eye} = P_{corr} P_{zone} P_{sigma} P_{color}$$

Its value is in the range of 0.0 to 1.0. The figure of merit $P_{eye}$ is calculated for both the left and the right candidate redeye pixels in a pair. The average of these two values is given by $$P_{pair} = \frac{P_{eye}^{Left} + P_{eye}^{Right}}{2}$$

The pair of candidate redeye pixels for which $P_{pair}$ is the largest is referred to as the best pair of candidate redeye pixels S20f. If $P_{pair}$ exceeds the threshold MinEyeScore equal to 0.05, then the program processes further. Otherwise, the program concludes that a pair of redeyes is not present in the sub-color-image S20g.

It is important to minimize the possibility that the best pair of candidate redeye pixels that are not part of a pair of eyes with a redeye defect in the color image be incorrectly classified. One method of confirming that a pair of redeyes has indeed been located is to use the fact that a human face is approximately symmetric about a line that bisects the face S24 in FIG. 2. In order to do this, the sub-color-image is rotated so that the tilt of a line connecting the best pair of candidate redeye pixels is equal to zero. Next, an image centered at the midpoint between the eyes is cut-out of the sub-color-image. This image has a width of 1.5 times the distance between the candidate redeye pixels and a height equal to a quarter of its width. This image is in turn cut in half. The left half-image we refer to as $E^x_{left}(p,l)$ and the right half-image by $E^x_{right}(p,l)$ where the superscript x refers to a band of the color image. For example, $E^r_{left}(p,l)$ refers to the red band of the image. The columns in the right half-image are inverted (the first column becomes the last column, etc.) so that it becomes a mirror image of itself. A correlation of $E^x_{left}(p,l)$ and $E^x_{right}(p,l)$ is performed by first calculating the sum of products $$\Pi^x_{sym} = \frac{1}{N} \sum_p \sum_l E^x\text{left}(p, l) E^x\text{right}(p, l)$$

where the summations over p and l are over all of the columns and rows in the half-images, respectively, and N is the number of pixels in the half-images. The correlation is given by $$C^x_{sym} = \frac{\Pi^x_{sym} - M^x_{left} t M^x_{right}}{\sigma^x_{left} \sigma^x_{right}}$$

where $M^x_{left}$ and $M^x_{right}$ are the mean code values of band x of the half-images and $\sigma^x_{left}$ and $\sigma^x_{right}$ are the standard deviations. A score $P_{sym}$ is defined based on a symmetry scoring function $pSym(C^x_{sym})$ by $$P_{sym} = pSym(C^r sym) pSym(C^g sym) pSym(C^b sym)$$

The final score P is simply the product of $P_{sym}$ and $P_{pair}$.

$$P = P_{sym} P_{pair}$$

If this score which may range between 0.0 and 1.0 exceeds a threshold MinScore which is set equal to 0.05 S26, then the candidate redeye pixel pair is assumed to mark the location of a pair of redeye defects in the resized sub-color-image.

Finally, the positions of the left and right redeye defects in the original color image are calculated based on the position of the left and right candidate redeye pixels in the resized sub-color-image using the relations $$p' = \frac{p - Pad}{S_{prescale}} + Col_{cutout} - 1$$

$$l' = \frac{l - Pad}{S_{prescale}} + Row_{cutout} - 1$$

where p and l are the column and row of the left candidate redeye pixel in the resized sub-color-image and p' and l' are the corresponding positions in the original color image S28.

It sometimes happens that two different skin colored regions after being fitted to an ellipse will overlap or be very close together. This may result in the same redeye pair being found twice or the detection of two redeye pairs that are too close together for both to be truly a pair of redeyes. For this reason, after all the redeye pairs in the color image have been located it is determined if any two pairs have redeye locations less than MinInterpairEyeDistance equal to 20 pixels apart. If this is the case the pair with the lower score is eliminated S30.

On page 5 line 22 to page 8 line 22, a procedure is described that determines the location of possible faces in the image (see FIG. 1. In this procedure the color and shape of regions of approximately uniform color are examined. There is an additional means of verifying that skin colored region is a face. This method is based on the observation that a face is usually skin except for the eyes, eyelashes, and mouth. This is illustrated by FIG. 5 which shows maps of continuous skin colored regions. Notice that there are significant holes within the skin map in which are located pixels that do not have the color of skin. These holes occur where the eyes, eyelashes, and mouth are located. There are many situations where the eyelashes and mouth will not cause a hole in the skin map and situations where other image features will cause additional holes. Even though the number of non-skin colored holes may vary for many reasons it is useful to place a limit or assign a scoring function based on the number of holes. Typically, if the number of non-skin colored holes is greater than 10 the continuous skin colored region is determined not to be a face and is not processed further.

Figure 14:
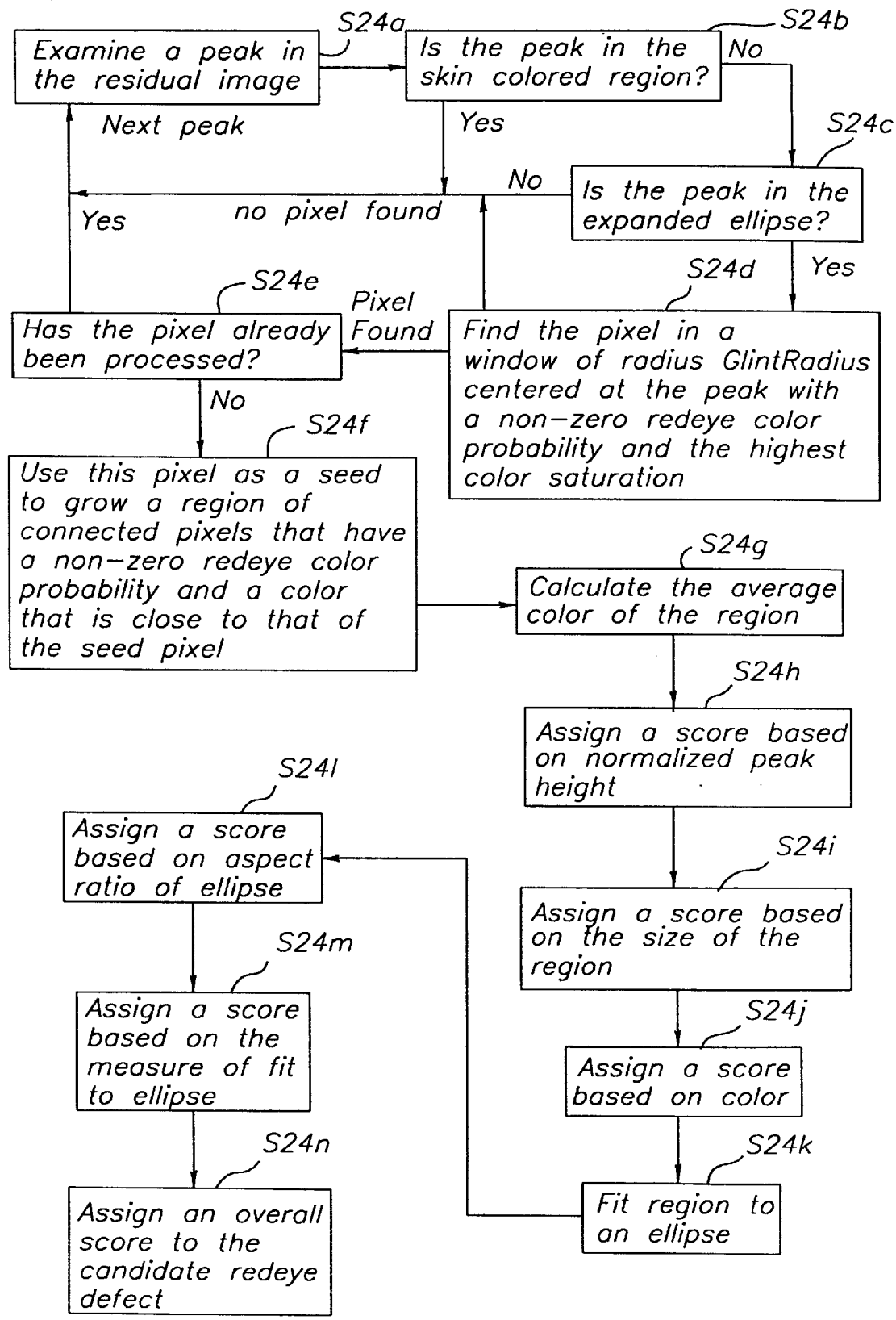
FIG. 14 illustrates an alternative method of locating faces in an image.

In FIG. 14, an alternative of FIG. 9 steps S26f through S16k is illustrated for finding single redeye defects. As a result of steps S16a to S16e in FIG. 9 a smooth residual image is produced in which pixels that belong to small red features in the original image are assigned a high code value and all other features are assigned a low code value. Starting in step S24a in FIG. 14 the algorithm examines the peaks in the smooth residual image.

When a map of the skin colored regions of a face is made as in FIG. 5 the eyes will not be part of the map because the colors normally found in an eye are different than those normally found in skin. Therefore, in step S24b it is determined if the peak pixel is part of the skin colored region of the image. If this pixel is part of the skin colored region, the program proceeds to the next peak. If the peak pixel is not in the skin colored region, the program proceeds to the next step S24c.

A redeye defect must occur in the region of a face. Usually it will occur within a hole in the skin map of the face. However, if the face is in a slight profile position with respect to the camera that captured the image, the redeye defect may occur outside of the skin map. As shown in step S8 of FIG. 2, the map of skin colored regions is fitted to an ellipse. This ellipse is referred to as the ellipse of best fit. It is possible for a redeye defect that is associated with a face to fall outside the ellipse of best fit due to the face being in a profile position. For this reason, an expanded ellipse is defined that has the same center and shape as the ellipse of best fit, but a greater radius. Typically the radius will be twice as large. A peak pixel must fall inside of the extended ellipse for it to be considered further. This is shown in step S24c of FIG. 14.

A peak pixel may be located at a position in a redeye defect that corresponds to the glint caused by the camera flash reflected form the eye. In this case, the color of the pixel will be a bright neutral. It is desirable to locate a pixel near the peak pixel that has the color of the redeye defect. For this reason in step S24d pixels in a radius of GlintRadius around the peak pixel are examined. If no pixels are found with a non-zero probability (described hereinbelow) based on color of being part of a redeye defect, move on to the next peak pixel. Otherwise, select This pixel selected in step S24d is referred to as the grow pixel because it will be used to grow a region of the image that corresponds to the complete redeye defect. But first, in step S24e, it is determined if the grow pixel has already been processed. If so, consider the next peak pixel.

In step S24f, the grow pixel is used as a seed to grow a connected region of pixels all of which have a color that is within some set color distance of the grow pixel and has a non-zero redeye color probability. This grown region is a candidate redeye defect. Referring to step S24g, the average color in the candidate redeye defect is calculated.

Figure 15A:
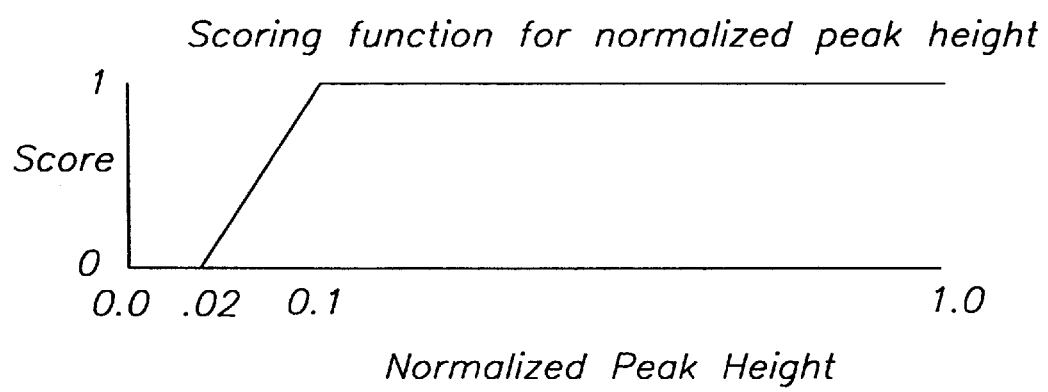
FIG. 15 illustrates scoring functions.

The next series of steps involve assigning a score to the candidate redeye defect based on several characteristics. The first is the code value of the peak pixel in the residual image that was used to locate the candidate redeye defect. This code value is normalized by dividing it by the maximum code value possible in the original image. For example, divide by 255 in the case of an 8-bit image. The normalized code value is a assigned a score S24h according to the scoring function shown in FIG. 15a. As is obvious from the graph, if the normalized peak height is between 0 to 0.02 the score is zero; for a normalized peak height above 0.02 to 0.1 the score increase linearly; and for a normalized peak height between 0.1 to 1.0, the score is 1.

Figure 15B:
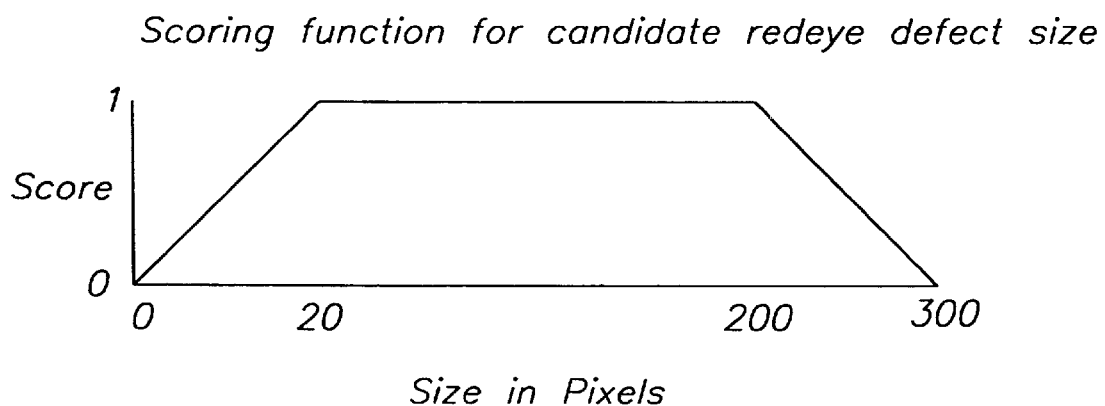

Similarly, a score is assigned based on the size (number of pixels) in the candidate redeye defect S24i. The scoring function associated with this quantity is also shown in FIG. 15b.

Figure 16A:
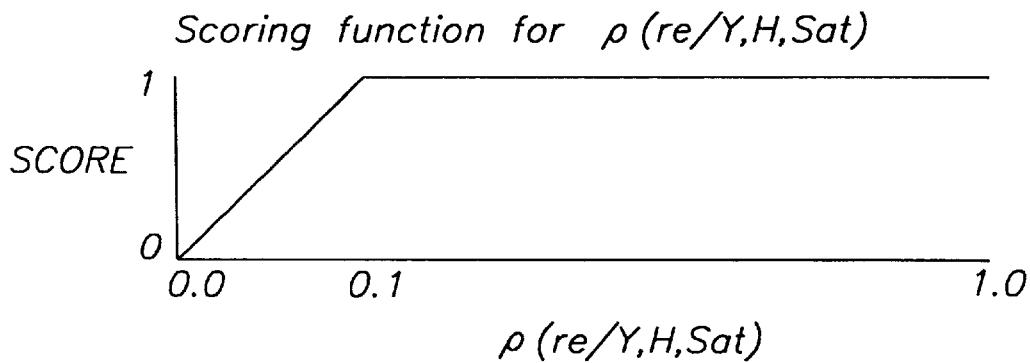
FIG. 16 illustrates scoring functions.

Referring back to FIG. 14, in step S24j a score is assigned to the defect based on its average color. Approximately 200 images were examined which had one or more redeye defects in them. By sampling redeye pixels a joint probability function was built denoted by ρ(re / Y, H, Sat) which is proportional to the probability of a redeye defect pixel having a luminance Y, hue H, and saturation Sat. This function is normalized so that its maximum value equals 1.0. The candidate redeye defect is assigned a score based on the value of ρ(re / Y, H, Sat) for the average color of the defect. A typical scoring function for ρ(re / Y, H, Sat) is shown in FIG. 16a.

Figure 16B:
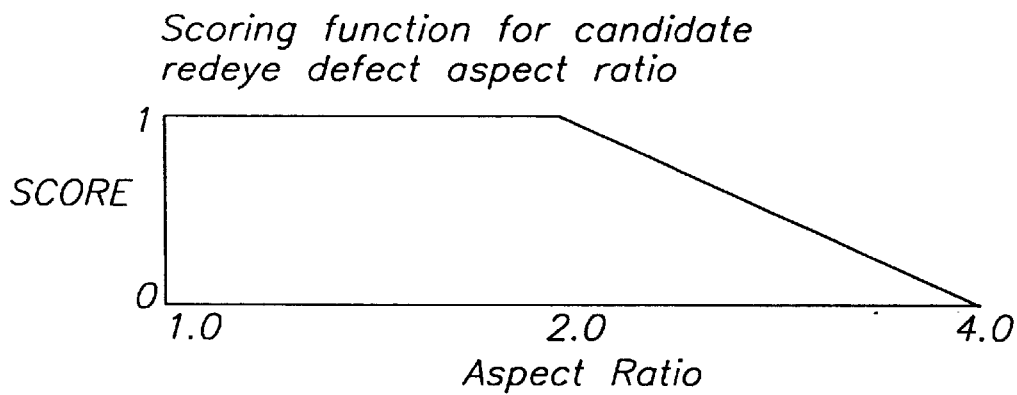
Figure 16C:
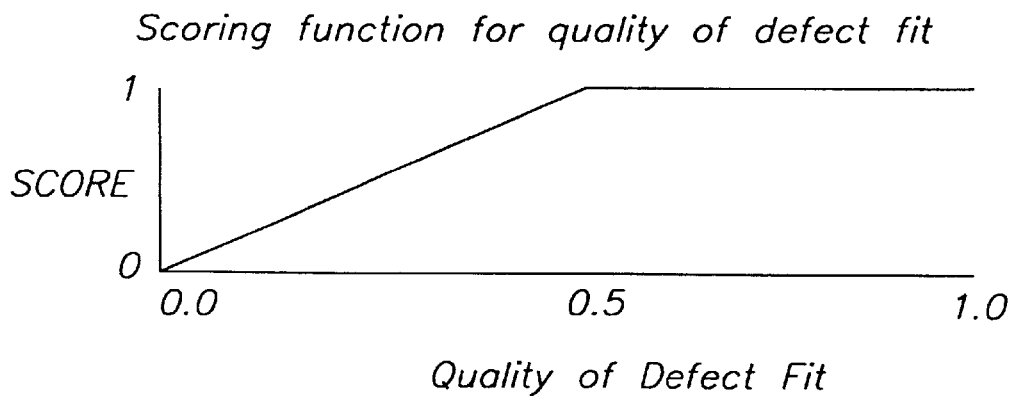

Referring back to FIG. 14, in the next step S24k, the candidate redeye defect is fitted to an ellipse. In step S24l a score is assigned to the candidate redeye defect based on the aspect ratio of the ellipse. A typical scoring function for the aspect ratio is shown in FIG. 16b. In step S24m a score is assigned for the quality of the fit to an ellipse. A typical scoring function for the quality of fit to ellipse is shown in FIG. 16c.

A total score can now be assigned S24n to the candidate redeye defect based on a combination of all of the above scores. Typically, this score is the product of the individual scores although the use of the sum or median value is also contemplated. The candidate redeye defects can now be assigned a ranked order based on this score.

In subsequent steps that involve looking for pairs of redeye defects it is useful to start with the individual candidate redeye defects that have the highest score first and to place a limit on the total number of candidate redeye defect pairs that can be examined by the algorithm. This prevents the execution time of the algorithm from becoming undesirably large in the case that there is a large number of candidate redeye defects and insures that the best candidates will be examined before the limit is exceeded.

Although a major intent of this invention is to find redeye pairs sometimes redeye defects occur singly because one eye is obscured or for some reason does not exhibit the redeye phenomena. The procedure at this point is suited for finding single redeye defects because at this point no use has been made of the fact that redeye defects normally occur in pairs.

Figure 17A:
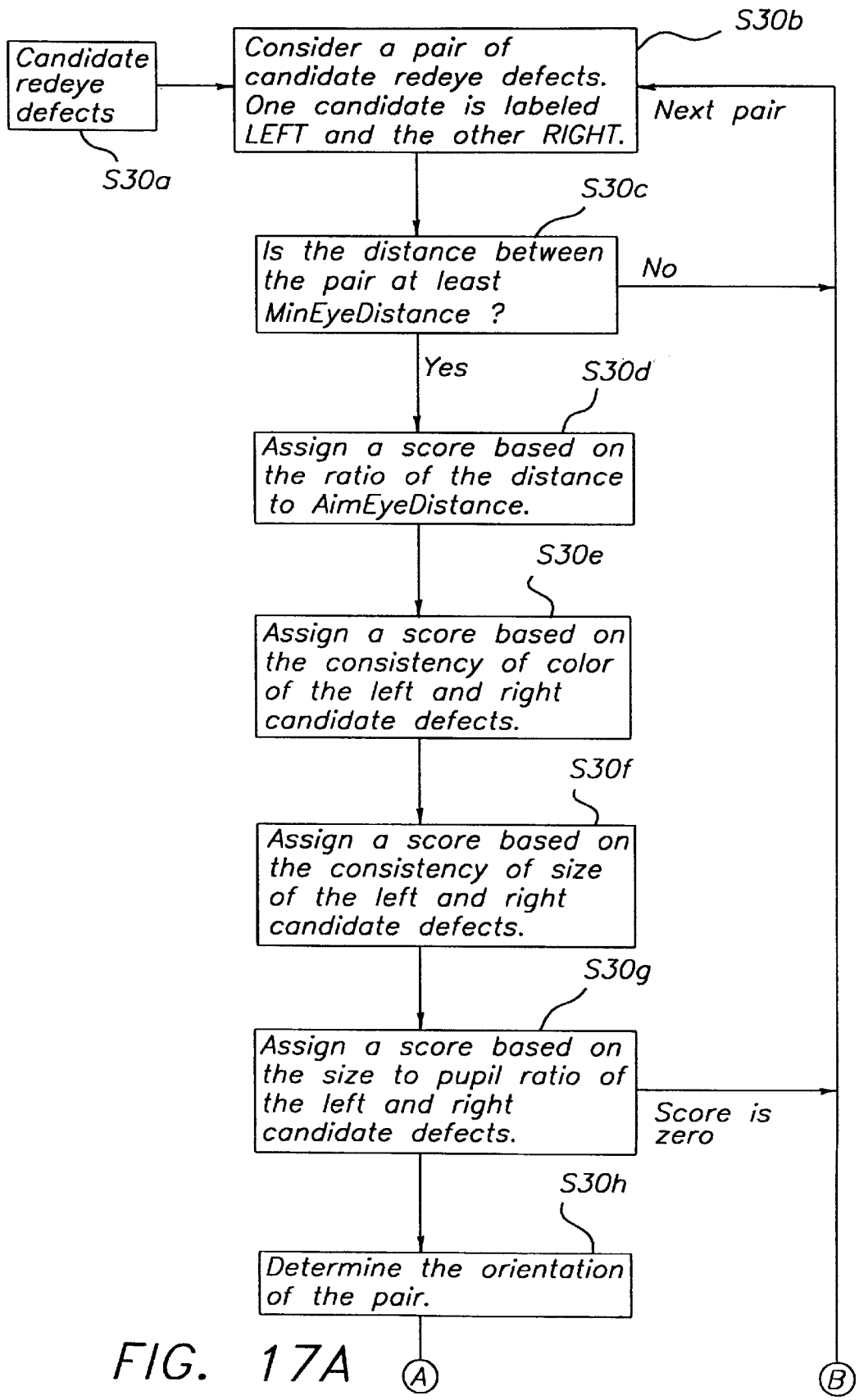
FIG. 17 illustrates a method of redeye defect pair detection.
Figure 17B:
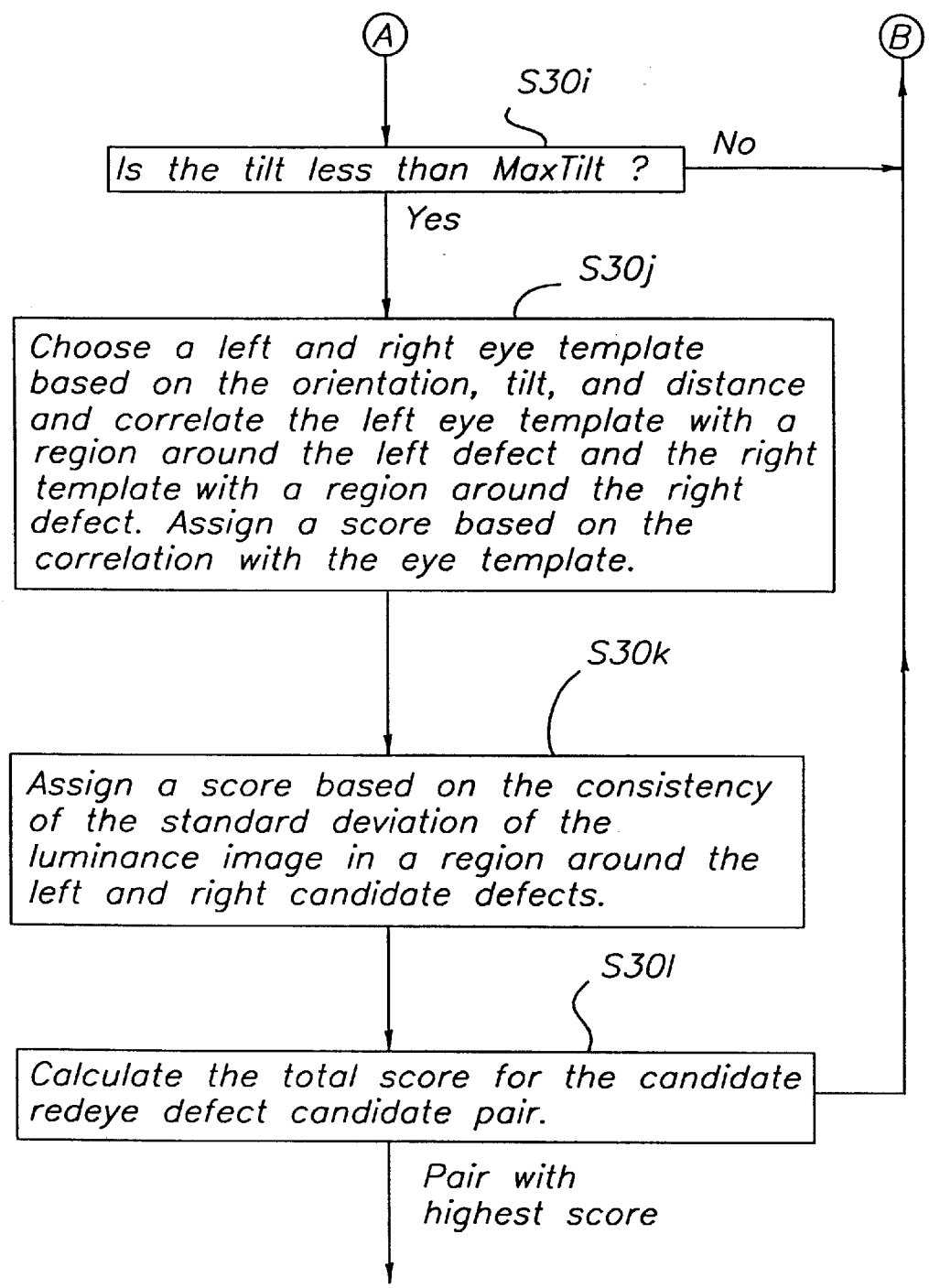

In FIG. 17 a method is shown of processing two candidate redeye defects at a time in order to determine if they are in fact a pair of redeye defects. This method is an alternative embodiment to the method shown in FIG. 11. It should be understood that there are many features in an image that may be mistaken for a redeye defect. For example, red ornaments on a Christmas tree. The key to being able to detect redeye defects without human intervention, which is a major objective of this invention, is to require that redeye defects occur in pairs and that the two defects in the pair be consistent with one another and with the skin colored region near or in they are located.

In step S30a in FIG. 17 the program starts with the candidate redeye defects that were obtained by the series of steps shown in FIG. 14. At this point, each candidate has been assigned a score based on its color, size, and shape which relates to the probability that the candidate is a real redeye defect. In step S30b the program starts by selecting a candidate redeye defect as the left candidate redeye defect and pairs it up with another candidate defect referred to as the right candidate redeye defect. At this point, the program hypothesizes that the left candidate is the redeye defect on the left when viewing an upright face in the image and the right candidate is the redeye defect on the right In step S30c, the program determines if the distance between the left and right defect in the original image in units of pixels is at least MinEyeDistance which is typically set to 30. If the distance is less than this value even if the candidates are actual redeye defects they will be so small that they will not be very visible. Therefore, we stop processing this pair and go to the next pair.

At this point, as described on page 8 line 23 to page 9 line 16, the image has been resized so that if the skin colored region is indeed a face the distance between eyes will be approximately equal to AimEyeDistance which is typically 75 pixels. In step S30d the pair is assigned a score based on the ratio of their separation to AimEyeDistance.

A powerful means of determining if a pair of candidate redeye defects are actually redeyes is to determine if their properties are consistent. This will be illustrated in detail below. For this purpose a measure of the consistency C of a quality X is defined by $$C = \frac{2|X_l - X_r|}{X_l - X_r} \qquad \text{Eq. 34}$$

where $X_l$ is the value of the quantity for the left candidate redeye defect and $X_r$ is the value for the right candidate defect. The smaller the value of C the more consistent the quantity X is.

The color of a redeye defect may vary considerably from image to image mainly because of color balance differences. Also, redeye defect color variations occur among people. However, when two redeye defects occur in a face their color should be consistent with each other. In step S30e in FIG. 17 the program assigns a score to the candidate redeye defect pair based on the consistency of their color. In general, the score decreases as the value of C increases.

The size of the left and right candidates defects should be roughly the same. In step S30f a score is assigned based on the consistency of the size of the left and right defect.

Given the distance between the eyes in a face it is possible to place limits on the size of the pupils of the eyes. Using the distance between the left and right candidate redeye defects a nominal pupil size is calculated. For example, if the number of pixels between the eyes is multiplied by 0.083, the square of the product is roughly the number of pixels in a pupil. Of course pupil size may vary significantly as a function of ambient light levels and other factors, but the number of pixels in a redeye defect should approximately match the number of pixels in a pupil of nominal size within a factor of approximately three. In step S30g, a score is assigned to both the left and right defect based on the ratio of their size to the nominal pupil size.

Figure 18A:
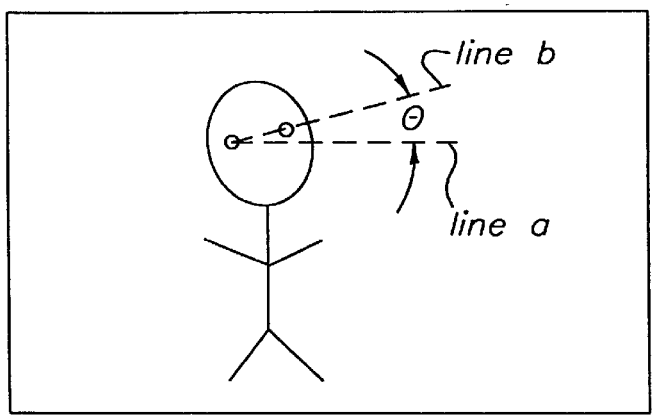
FIG. 18 illustrates different image orientations.
Figure 18B:
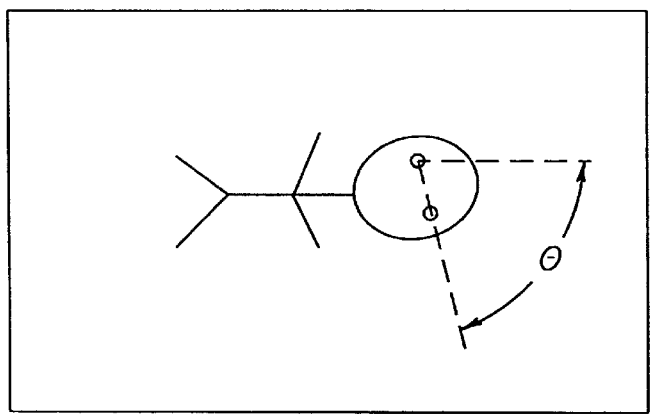
Figure 18C:
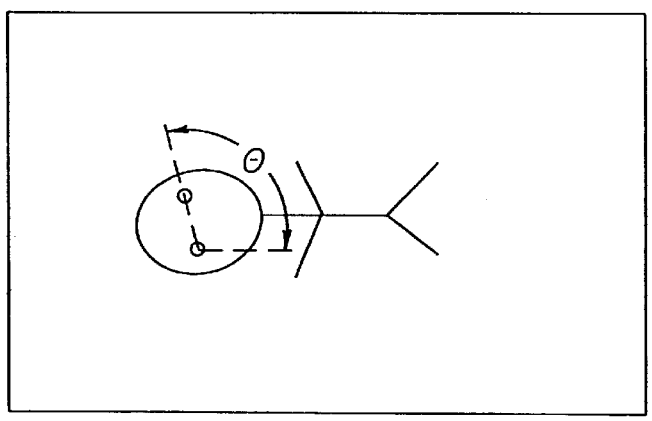

In most cases the orientation of the image is unknown. For example, the picture may be taken with the camera held upright and the image will have a landscape orientation as shown in FIG. 18a. Alternatively, the camera may be held sideways and the image will have a portrait orientation as shown in FIG. 18b and FIG. 18c. In addition to camera orientation the pose of a person in the image affects the orientation of a pair of redeye defects. For example, the image may be captured with the camera upright, but a person lying down may have their eyes oriented as in FIG. 18b.

The purpose of step S30h in FIG. 17 is to infer the orientation of the redeye defect pair that may be associated with a pair of candidate redeye defects. Referring to FIG. 18a the angle θ is defined as the angle between a horizontal line a that passes through the left candidate redeye defect and a line b that passes through both candidate redeye defects. θ is positive if line b is orientated counterclockwise from line a. If the absolute value of θ is less than MaxTilt which is typically set to 30 degrees the orientation is assumed to be as in image FIG. 18a. If the absolute value of θ+90 is less than MaxTilt the orientation is assumed to be as shown in image as in FIG. 18b. Finally, if the absolute value of θ−90 is less than MaxTilt the orientation is assumed to be as in image as in FIG. 18c. It should be noted that the object of this invention is to detect a pair of redeye defects and not to determine which defect is in the left and right eye. Therefore, it is of no consequence if a defect pair with an orientation as shown in image in FIG. 18b is mistaken for a pair with the orientation as shown in FIG. 18c.

If θ satisfies one of the three conditions stated above, the tilt of the candidate redeye pair with respect to a horizontal line in the image is less that MaxTilt. In this case (see step S30i in FIG. 17) the pair of candidate redeye pixels is processed further. Otherwise, the next pair is considered.

In step S30j in FIG. 17 the region around the left and right candidate redeye defect are correlated with a left and right eye template as described in detail hereinabove on page 11, line 18 through page 13, line 3. The templates are chosen based on the assumed orientation, distance between the candidate redeye defects, and their relative tilt. A score is assigned based on the value of the correlations.

In step S30k a score is assigned base on the consistency of the standard deviation of the luminance in the region around the left and right candidate redeye defects. As described hereinabove on page 23, line 6 through page 15 line 21, this standard deviation is calculated in the process of calculating the correlation.

Finally, in step S30l the total score for the candidate redeye defect pair is calculated. The total score is preferably some combination of all of the scores mentioned above. For example, the total score is equal to the product of the individual scores. After this step, the program returns to step S30b and repeats the process for the next pair of candidate redeye defects. In some cases, it is desirable to place a limit on the total number of pairs that can be processed so that the execution time does not become too large in the case that there is a very large number of candidate redeye defects.

The candidate redeye defect pair with the highest score is processed further. The mirror symmetry of the region of the image in the vicinity of the pair about a line that bisects a line that connects the candidate redeye defects is calculated. This is discussed in detail starting on line 16 on page 21. A score is assigned to the pair based to symmetry.

An additional method of verifying that the pair is an actual pair of redeye defects is based on the fact that people have no more than two eyes. This means that a pair of candidate redeye defects should not have additional image features nearby that are similar to the defects in the pair. A score is assigned to the pair of candidate redeye defects based on the number of other candidate redeye defects that are nearby. The score decreases as the number of nearly additional candidate increases.

The modified score is then calculated which is a combination of the score calculated in step S30l and the symmetry score and extra candidate defect scores described above. Preferably, the scores are combined by multiplication. If the resultant score exceeds some threshold the pair of candidate redeye pixels are classified as a pair of redeye defects and have their color corrected.

Figure 19:
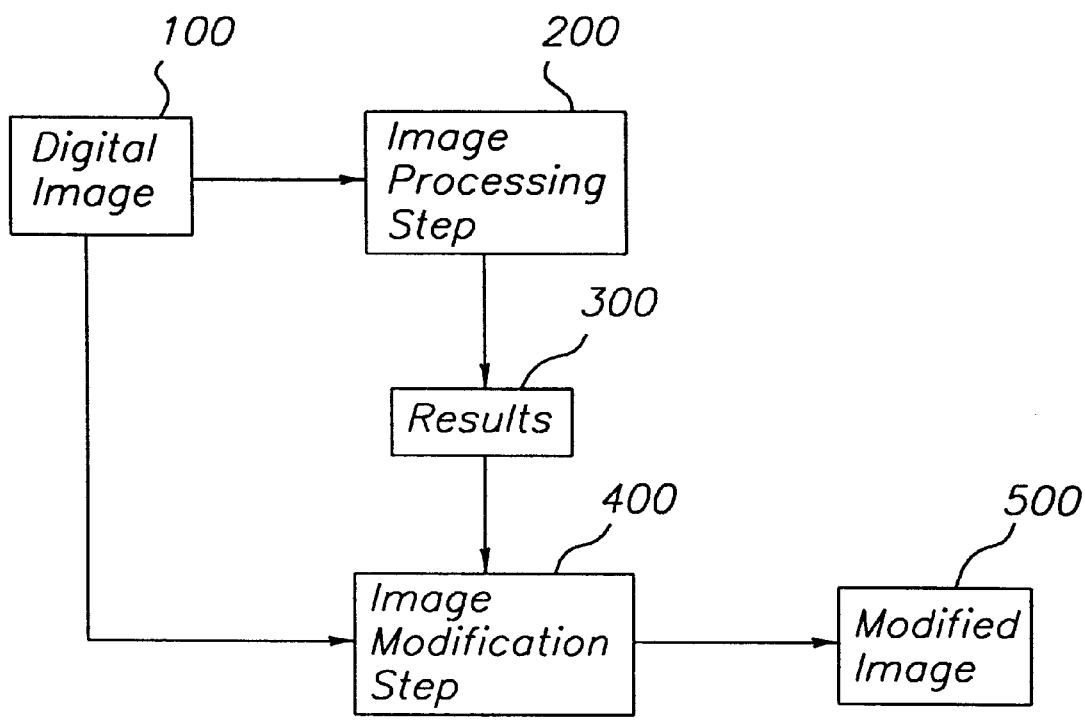
FIG. 19 illustrates an overview of the present invention.

With reference to FIG. 19, there is shown an overview of the present invention. The digital image 100 is digitally processed 200 to detect the redeye defects. The results 300 are used to selectively modify the image 400 at the locations obtained in the detection step. The result is a modified digital image 500 with some or all of the redeye defects corrected.

What is claimed is:

1. A method for detecting eye color defects of a subject in an image due to flash illumination, the method comprising the steps of:
   (a) detecting a skin colored region in a digital image;
   (b) detecting a human face by determining if the skin colored region has a predetermined characteristic of a human face;
   (c) detecting a pair of candidate redeye defects originating from a pair of eyes in or adjacent to the detected human face based on comparing a distance between the candidate redeye defects and a dimension of the detected human face; and
   (d) selecting the candidate redeye defects as actual redeye defects based on the results of step (c).

2. The method as in claim 1, wherein step (c) includes providing a width of the detected human face as the dimension of the detected human face.

3. A method for detecting eye color defects of a subject in an image due to flash illumination, the method comprising the steps of:
   (a) detecting a pair of candidate redeye defects originating from a pair of eyes in the image; and
   (b) evaluating the pair of candidate redeye defects based on a characteristic of each defect in the pair in relation to a distance between the redeye defects.

4. The method as in claim 3, wherein step (b) includes providing a size of the redeye defect as the characteristic.

5. The method as in claim 3, wherein step (b) includes providing a match to an eye template as the characteristic.

6. A method for detecting and correcting eye color defects of a subject in an image due to flash illumination, the method comprising the steps of:
   (a) detecting a skin colored region in a digital image;
   (b) detecting a human face by determining if the skin colored region has a predetermined characteristic of a human face;
   (c) detecting a pair of candidate redeye defects originating from a pair of eyes in or adjacent to the detected human face based on comparing a distance between the candidate redeye defects and a dimension of the detected human face;
   (d) selecting the candidate redeye defects as actual redeye defects based on the results of step (c); and
   (e) correcting the redeye defects.

7. The method as in claim 6, wherein step (c) includes providing a width of the detected human face as the dimension of the detected human face.

8. A method for detecting and correcting eye color defects of a subject in an image due to flash illumination, the method comprising the steps of:
   (a) detecting a pair of candidate redeye defects originating from a pair of eyes in the image;
   (b) evaluating the pair of candidate redeye defects based on a characteristic of each defect in the pair in relation to a distance between the redeye defects; and
   (c) correcting the pair of redeye defects.

9. The method as in claim 8, wherein step (b) includes providing a size of the redeye defect as the characteristic.

10. The method as in claim 8, wherein step (b) includes providing a match to an eye template as the characteristic.

11. A method for detecting eye color defects of a subject in an image due to flash illumination, the method comprising the steps of:
    (a) detecting a skin colored region in a digital image;

(b) detecting a human face by determining if the skin colored region has a predetermined characteristic of a human face;

(c) detecting a candidate redeye pixel based at least in part on a position of the candidate redeye pixel in a non-skin colored hole in the detected human face, wherein said detecting a candidate redeye pixel includes growing a candidate redeye defect from the candidate redeye pixel and evaluating the candidate redeye defect based on at least one of the size, color and shape of the candidate redeye defect grown from the candidate redeye pixel; and (d) selecting a candidate redeye defect based on the results of step (c).

12. The method as claimed in claim 11 wherein step (c) further comprises the step of assigning a score based on at least one of the size, color and shape of the candidate redeye defect grown from the candidate redeye pixel.

13. The method as claimed in claim 12 further comprising the steps of scoring a pair of candidate redeye defects originating from a pair of eyes in or adjacent to the human face based on comparing the consistency of at least one of their size, shape and color; and selecting the candidate redeye defects as actual redeye defects based on the scoring results.

* * * * *